(12) United States Patent
Matsuura et al.

(10) Patent No.: US 7,136,684 B2
(45) Date of Patent: Nov. 14, 2006

(54) HEADSET WITH RADIO COMMUNICATION FUNCTION AND COMMUNICATION RECORDING SYSTEM USING TIME INFORMATION

(75) Inventors: Hiroshi Matsuura, Tokyo (JP); Yoichi Takebayashi, Kanagawa (JP); Shinichi Tanaka, Kanagawa (JP); Hiroshi Kanazawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 460 days.

(21) Appl. No.: 10/337,431

(22) Filed: Jan. 7, 2003

(65) Prior Publication Data

US 2003/0130016 A1 Jul. 10, 2003

(30) Foreign Application Priority Data

Jan. 7, 2002 (JP) ............... 2002-000915

(51) Int. Cl.
*H04B 7/00* (2006.01)
*H04B 1/38* (2006.01)
*H04M 1/00* (2006.01)

(52) U.S. Cl. ............... 455/575.2; 455/41.2; 455/569.1; 455/556.1; 455/556.2; 455/563; 455/565

(58) Field of Classification Search ............ 455/556.1, 455/556.2, 569.1, 575.2, 563, 565, 41.1–41.3
See application file for complete search history.

(56) References Cited

U.S. PATENT DOCUMENTS

| | | | |
|---|---|---|---|
| 5,029,218 A | 7/1991 | Nagayasu | |
| 5,787,414 A | 7/1998 | Miike et al. | |
| 6,636,238 B1 * | 10/2003 | Amir et al. | 715/730 |
| 6,665,835 B1 * | 12/2003 | Gutfreund et al. | 715/500.1 |
| 6,671,567 B1 * | 12/2003 | Dwyer et al. | 369/25.01 |
| 6,825,875 B1 * | 11/2004 | Strub et al. | 348/207.99 |
| 6,839,412 B1 * | 1/2005 | Baxter, Jr. | 379/88.14 |
| 6,839,669 B1 * | 1/2005 | Gould et al. | 704/246 |
| 6,898,620 B1 * | 5/2005 | Ludwig et al. | 348/14.09 |
| 6,912,498 B1 * | 6/2005 | Stevens et al. | 704/235 |

FOREIGN PATENT DOCUMENTS

| | | |
|---|---|---|
| JP | 60-68734 | 5/1985 |
| JP | 9-46627 | 2/1997 |
| JP | 11-25112 | 1/1999 |
| JP | 2000-67064 | 3/2000 |
| JP | 2000-115012 | 4/2000 |
| JP | 2000-209363 | 7/2000 |
| JP | 2000-236378 | 8/2000 |
| JP | 2001-188837 | 7/2001 |
| JP | 2001-272990 | 10/2001 |
| JP | 2001-292239 | 10/2001 |
| JP | 2001-308966 | 11/2001 |
| JP | 2001-308977 | 11/2001 |
| WO | WO 01/94885 A1 | 12/2001 |

* cited by examiner

*Primary Examiner*—Nay Maung
*Assistant Examiner*—Wen Huang
(74) *Attorney, Agent, or Firm*—Oblon, Spivak, McClelland, Maier & Neustadt, P.C.

(57) ABSTRACT

In a communication recording system using a headset with a radio communication function which transmits the first speech signal and receives the second speech signal by radio communications, the headset is provided with a time information acquisition unit for acquiring a time information indicating occurrence times of the first speech signal and the second speech signal, an information production unit for producing a recording information to be stored in which the time information is set in correspondence to the first speech signal and the second speech signal, and a memory unit for storing the recording information.

22 Claims, 34 Drawing Sheets

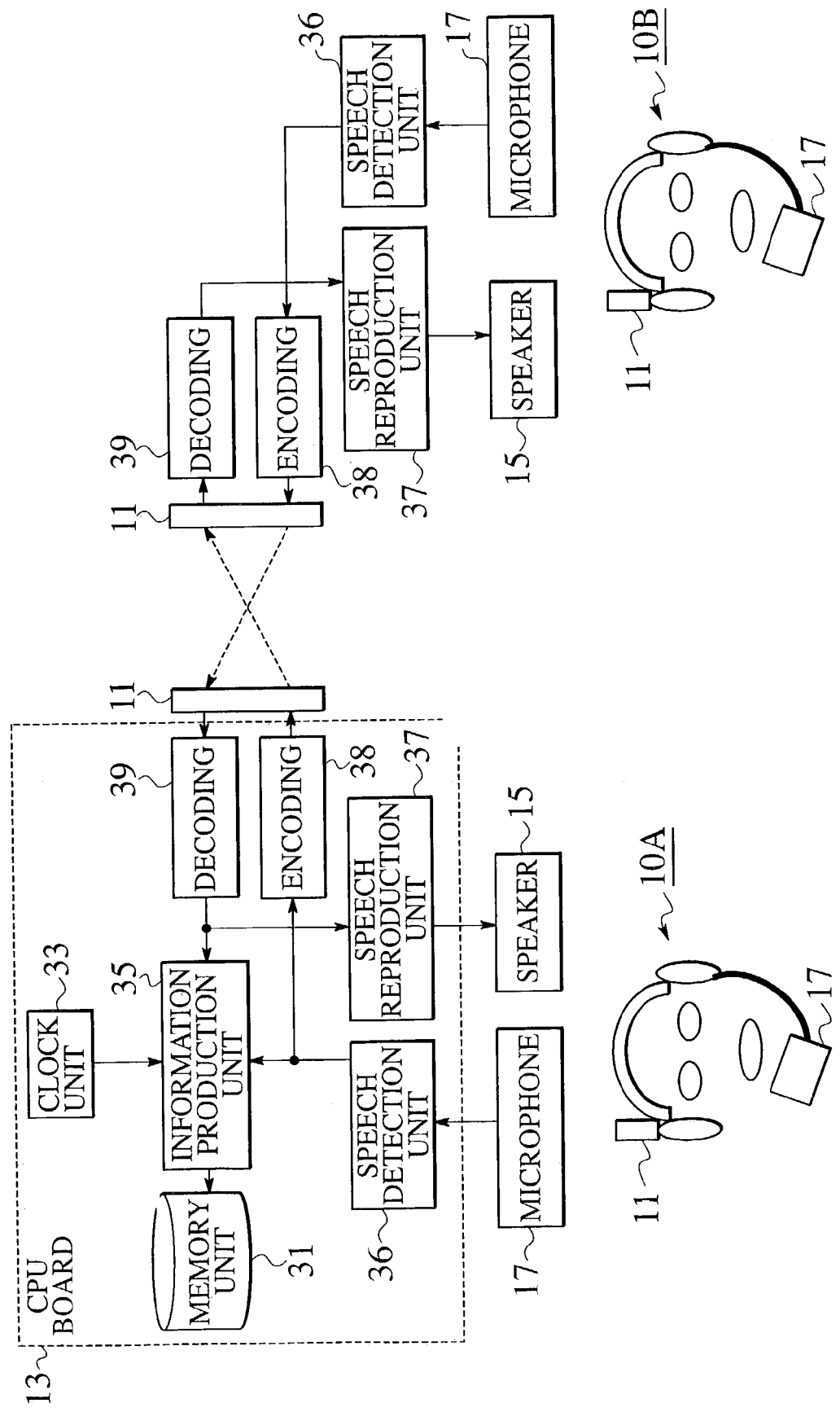

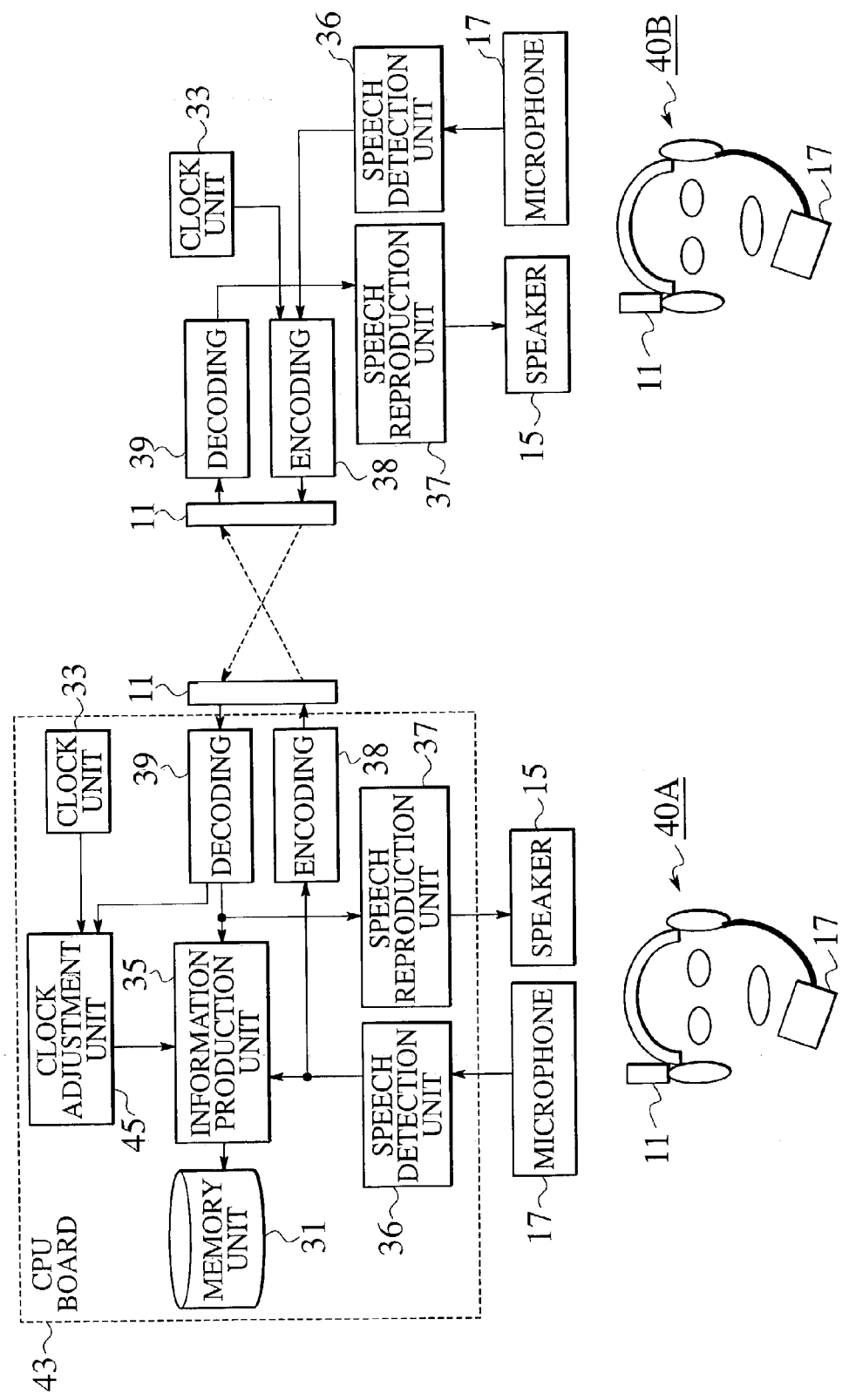

FIG.10

CARED PERSON'S SPEECH
DEVICE ID OF HEADSET 90B = 800001

TEXT FORMATION RESULT

CARETAKER'S SPEECH
DEVICE ID OF HEADSET 90A = 400001

YES, PLEASE.

WE ARE GOING TO CHANGE
MR. YAMADA'S CLOTHES NOW

TEXT FORMATION
RESULT

TIME
DECEMBER 20    ↑              ↑
              13:05:30      13:05:40

PLACE
CARED PERSON'S HOME

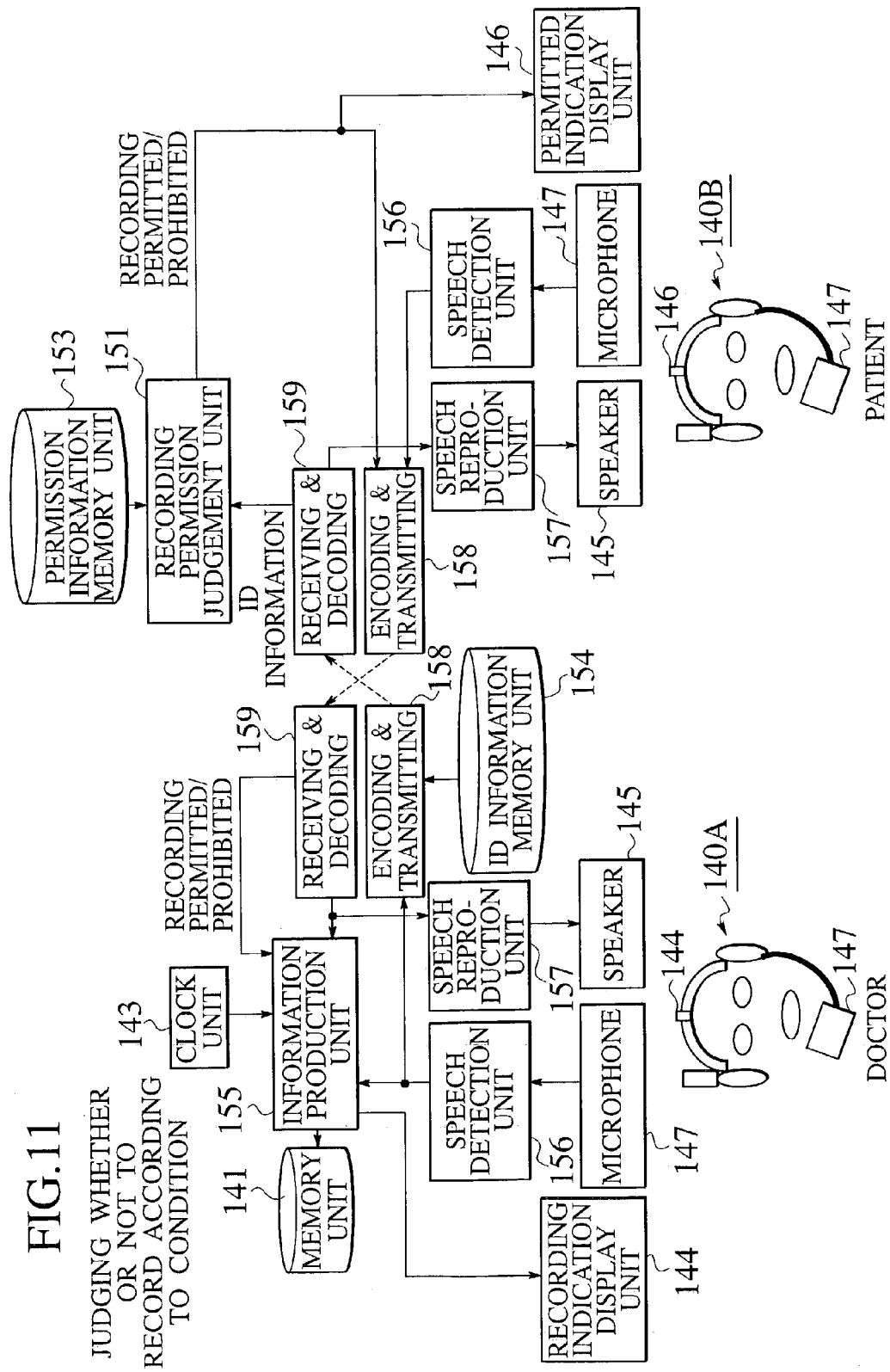

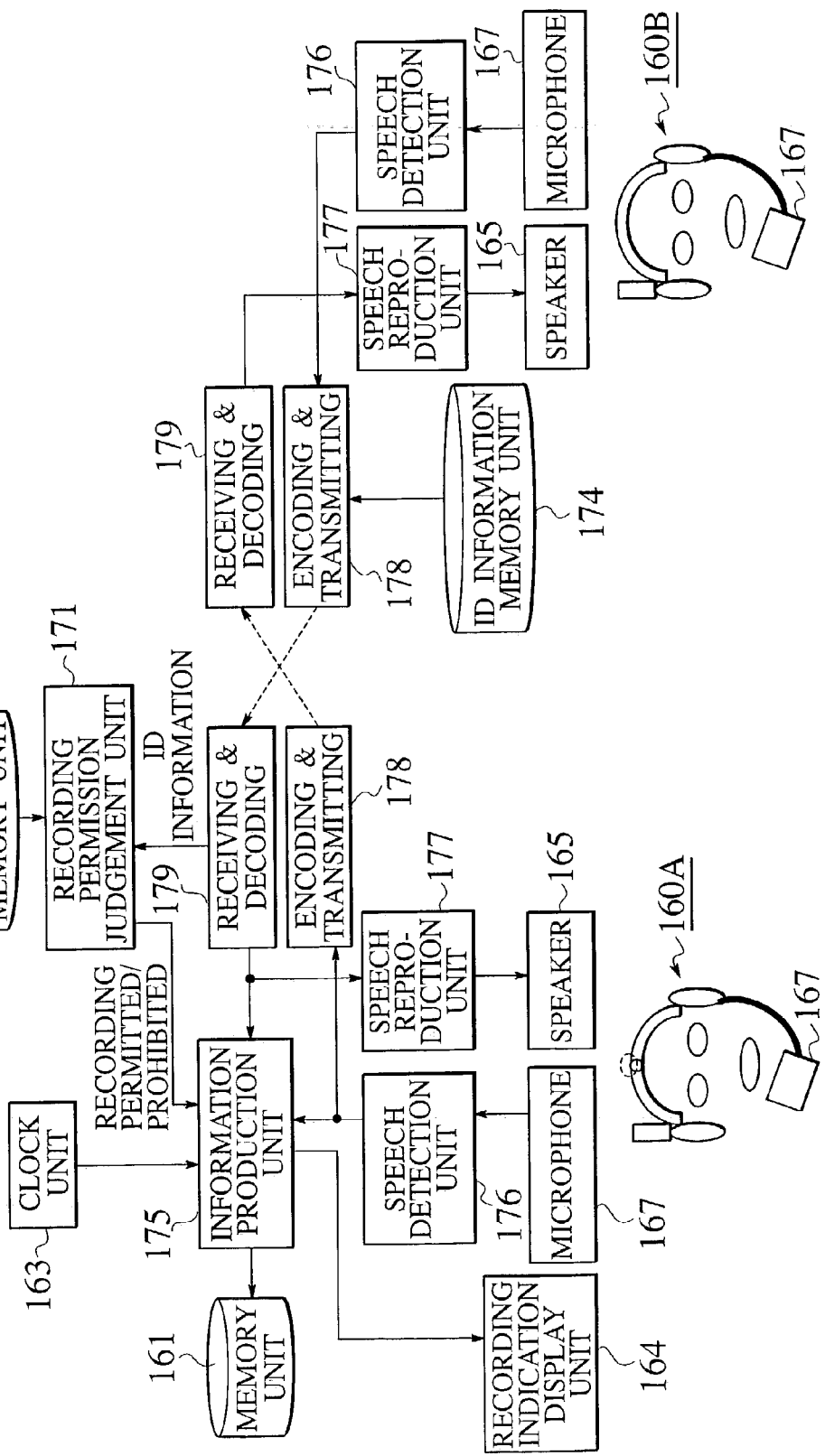
FIG.12 RECORDING CONVERSATION WITH SPECIFIC PERSON

FIG.13

(a)
| PLACE | * * * |
|---|---|
| TIME | * * * |
| CORRESPONDENT | DOCTOR B |

(b)
| PLACE | * * * |
|---|---|
| TIME | * * * |
| CORRESPONDENT | PHYSICIAN OF HOSPITAL A |

(c)
| PLACE | MEDICAL WARD OF HOSPITAL A |
|---|---|
| TIME | * * * |
| CORRESPONDENT | * * * |

(d)
| PLACE | HOSPITAL A |
|---|---|
| TIME | * * * |
| CORRESPONDENT | * * * |

(e)
| PLACE | MEDICAL WARD OF HOSPITAL A |
|---|---|
| TIME | THREE MONTHS FROM 12/20 |
| CORRESPONDENT | * * * |

(f)
| PLACE | MEDICAL WARD OF HOSPITAL A |
|---|---|
| TIME | THREE MONTHS FROM 12/20 AND UNTIL TREATMENT ENDS |
| CORRESPONDENT | * * * |

(g)
| PLACE | MEDICAL WARD OF HOSPITAL A |
|---|---|
| TIME | THREE MONTHS FROM 12/20 OR UNTIL TREATMENT ENDS |
| CORRESPONDENT | * * * |

FIG.16

(a)
| REPRODUCTION PERMITTED PLACE | * * * |
|---|---|
| PERMITTED CONTENTS | * * * |
| REPRODUCING PERSON | * * * |

(b)
| REPRODUCTION PERMITTED PLACE | * * * |
|---|---|
| PERMITTED CONTENTS | * * * |
| REPRODUCING PERSON | DOCTOR OF HOSPITAL A |

(c)
| REPRODUCTION PERMITTED PLACE | * * * |
|---|---|
| PERMITTED CONTENTS | * * * |
| REPRODUCING PERSON | DOCTOR B |

(d)
| REPRODUCTION PERMITTED PLACE | * * * |
|---|---|
| PERMITTED CONTENTS | * * * |
| REPRODUCING PERSON | CORRESPONDENT |

(e)
| REPRODUCTION PERMITTED PLACE | HOSPITAL A |
|---|---|
| PERMITTED CONTENTS | * * * |
| REPRODUCING PERSON | * * * |

(f)
| REPRODUCTION PERMITTED PLACE | * * * |
|---|---|
| PERMITTED CONTENTS | MEDICAL EXAMINATION CONTENTS |
| REPRODUCING PERSON | * * * |

RECORDING

REPRODUCING

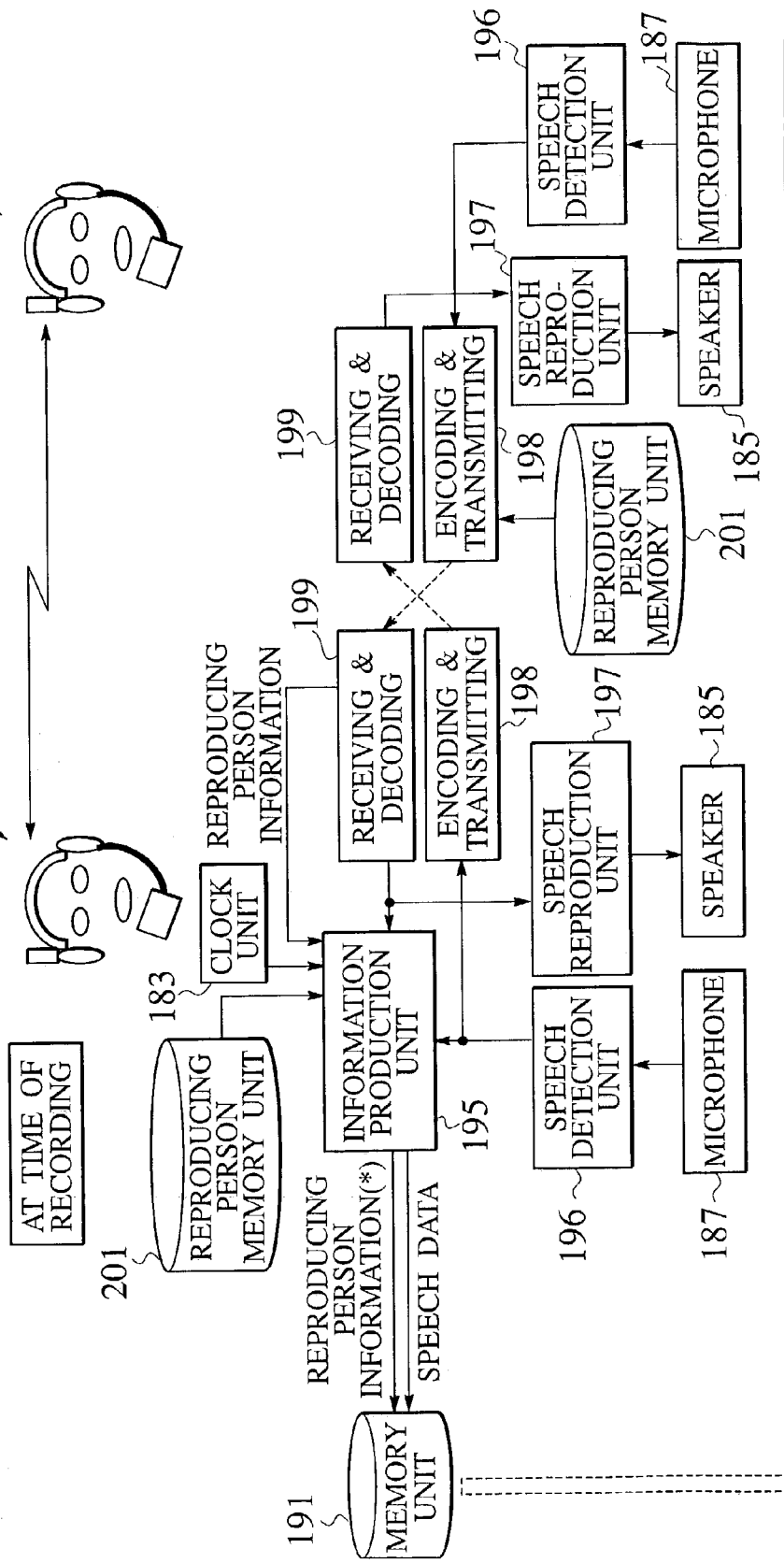

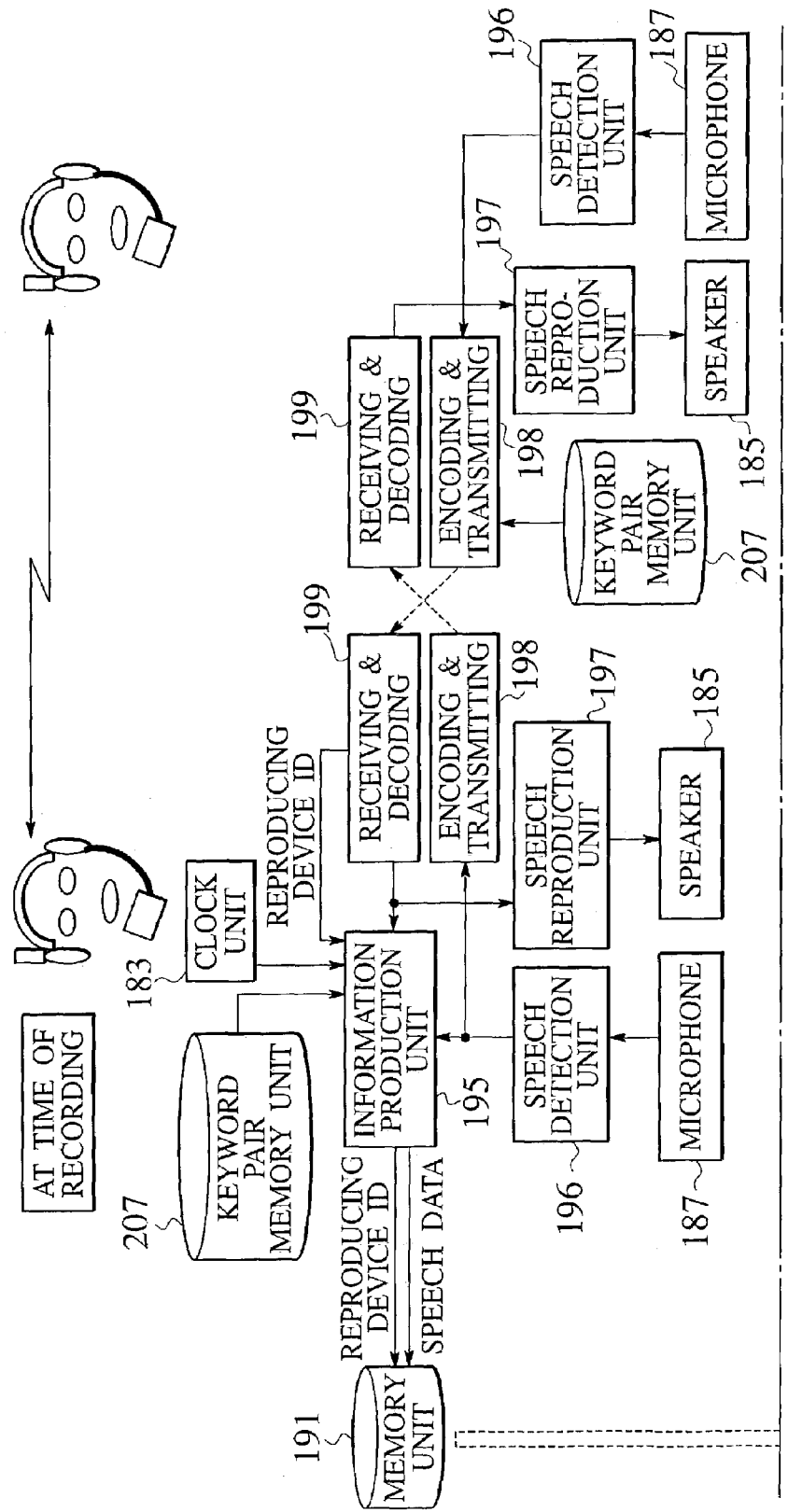

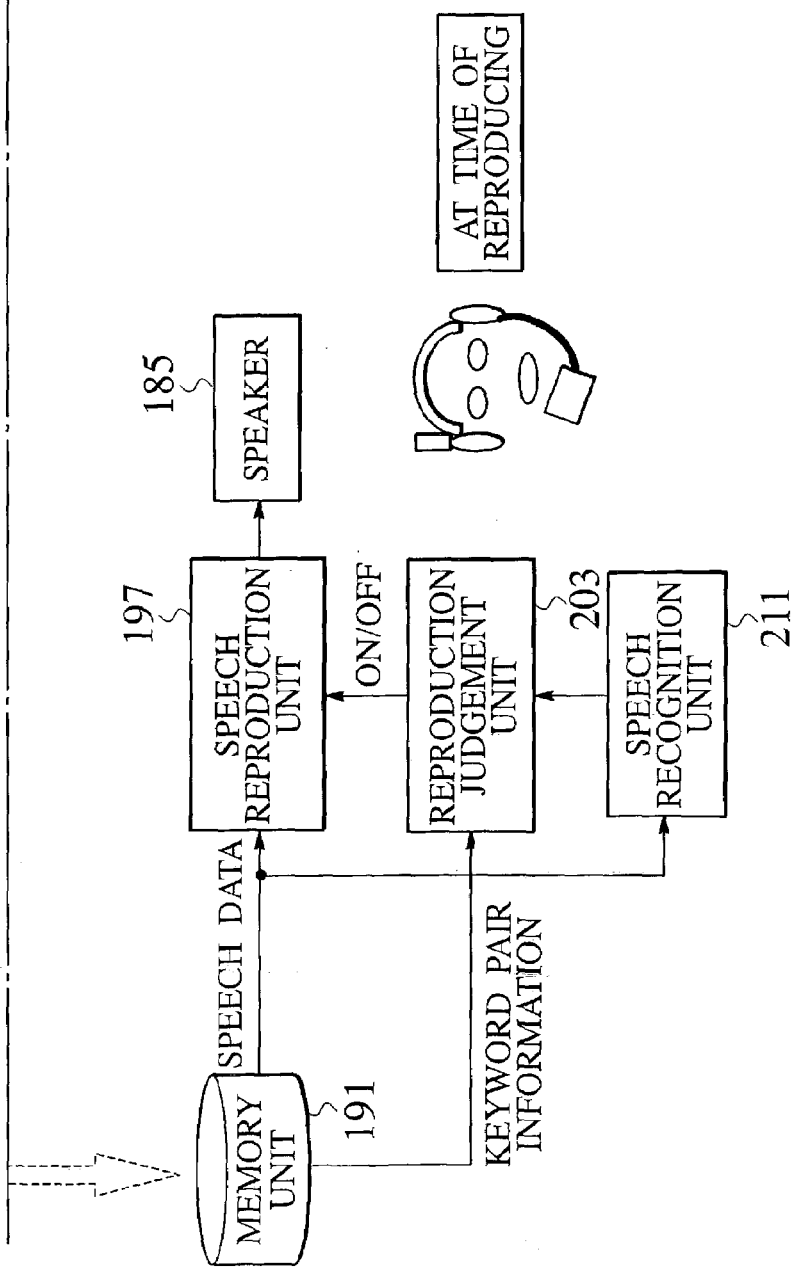

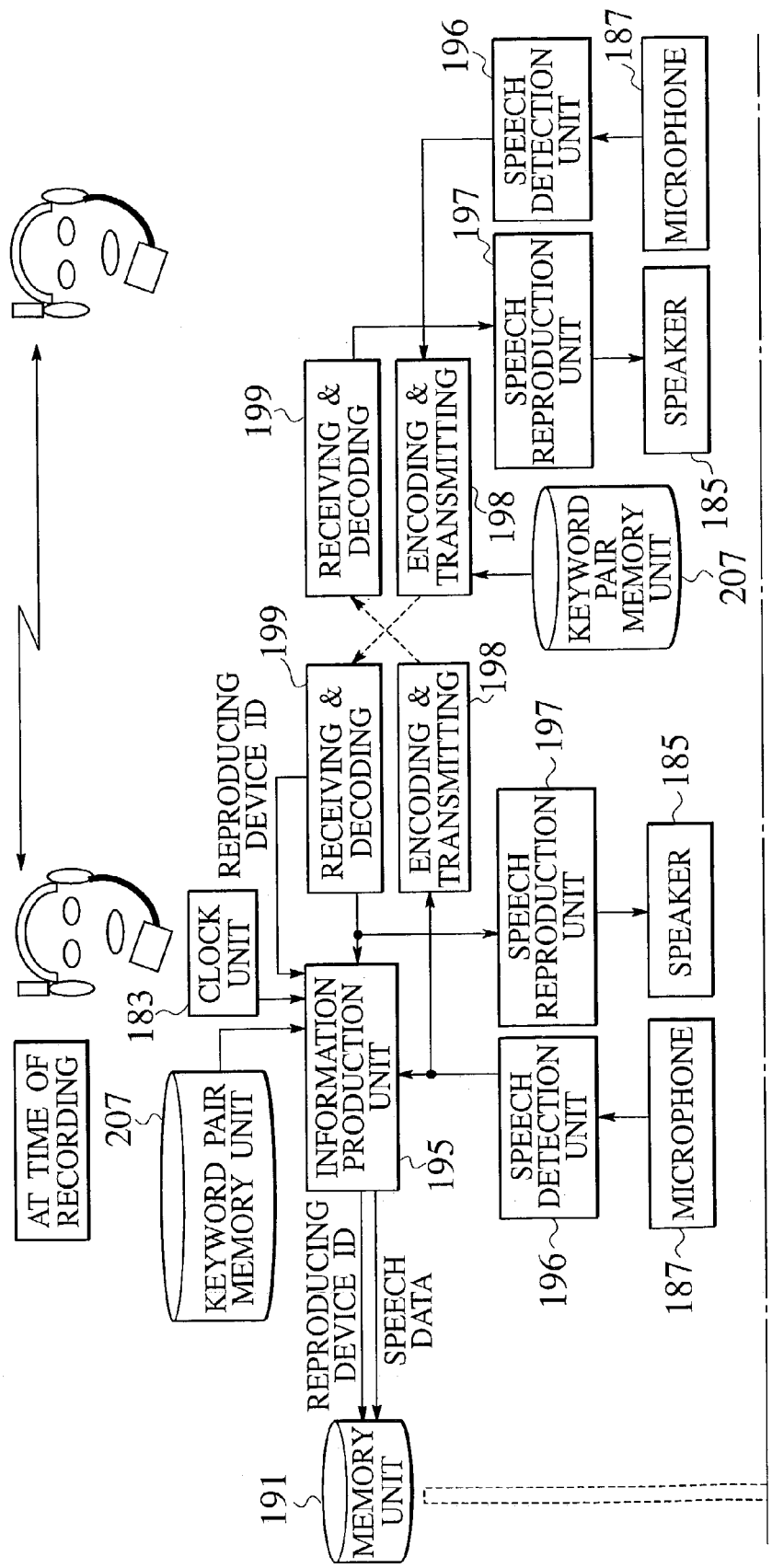

FIG.28

SPEECH COMMUNICATION STATE TABLE

| | | HEADSET A<br>(DEVICE ID 10001) | | HEADSET B<br>(DEVICE ID 20001) | |
|---|---|---|---|---|---|
| TRANSMISSION MODE | t1 | WANT TO BE HEARD | t1 | WANT TO BE HEARD | |
| | t2 | MAY BE HEARD | t2 | MAY BE HEARD | |
| | t3 | DON'T WANT TO BE HEARD | t3 | DON'T WANT TO BE HEARD | |
| RECEPTION MODE | r1 | WANT TO HEAR | r1 | WANT TO HEAR | |
| | r2 | MAY HEAR | r2 | MAY HEAR | |
| | r3 | DON'T WANT TO HEAR | r3 | DON'T WANT TO HEAR | |

FIG.29A  INPUT JUDGEMENT TABLE OF HEADSET A
○ : OUTPUT RECEIVED SPEECH SIGNAL OF HEADSET B
× : DO NOT OUTPUT RECEIVED SPEECH SIGNAL OF HEADSET B

|  |  | TRANSMISSION MODE OF HEADSET B | | |
|---|---|---|---|---|
|  |  | WANT TO BE HEARD | MAY BE HEARD | DON'T WANT TO BE HEARD |
| RECEPTION MODE OF HEADSET A | WANT TO HEAR | ○ | ○ | ○ |
|  | MAY HEAR | ○ | ○ | × |
|  | DON'T WANT TO HEAR | × | × | × |

FIG.29B  SPEECH OUTPUT JUDGEMENT TABLE OF HEADSET A
○ : OUTPUT SPEECH SIGNAL OF HEADSET A
× : DO NOT OUTPUT SPEECH SIGNAL OF HEADSET A

|  |  | RECEPTION MODE OF HEADSET B | | |
|---|---|---|---|---|
|  |  | WANT TO HEAR | MAY HEAR | DON'T WANT TO HEAR |
| TRANSMISSION MODE OF HEADSET A | WANT TO BE HEARD | ○ | ○ | ○ |
|  | MAY BE HEARD | ○ | ○ | × |
|  | DON'T WANT TO BE HEARD | × | × | × |

HEADSET WITH RADIO COMMUNICATION FUNCTION AND COMMUNICATION RECORDING SYSTEM USING TIME INFORMATION

BACKGROUND OF THE INVENTION

1. Field of the Invention

The present invention relates to a headset system for short range radio communication that realizes secrecy of the communication contents and easiness of search and reproduction, while enabling constant communication and constant recording by connecting ubiquitous devices through short range radio communications.

2. Description of the Related Art

The short range wireless communication system called Bluetooth has been developed, and it becomes possible to connect and control devices such as PC, printer, portable telephone, digital camera, etc., without using any cords.

In such a situation, the use of a headset with a radio communication function has been proposed in order to promote the application of such a system to the mobile environment and improve the convenience and smoothness of communications.

Currently, the mutual communications by radio are dominated by the speech communications using portable telephones and mails or chats using mobile terminals. However, in the case of the portable telephone, it is necessary to make a connection by specifying a correspondent at each occasion of making a communication. Also, the conversation exchanged through it is intact only on the spot and the conversed content is lost forever once the portable telephone is disconnected. On the other hand, in the case of the mail or chat by the radio communication, the communication contents will be preserved as texts but it is necessary to enter all the communication contents manually at the time of its use.

For these reasons, there is a demand for a system in which the content of the radio communication using speeches can be recorded in real time, stored and effectively utilized at later time. The recording of the speech has conventionally been realized by recording only a necessary portion of the direct sounds propagated as sound waves by using a recording device such as a tape recorder. The constant recording requires significant time and effort, so that it has not been realized except for the special cases such as-that surveying person's behavior for the academic purpose, for example. In recent years, a computer to be worn on the body and its applications have been studied in the field of the wearable computer, but how to process various information (environmental information and biological information) that is constantly sensed still remains as a subject to the further studying.

There is also a proposition of a technique for continuously recording surrounding sounds by providing a recording function to a PC, but this technique is only designed to be the first person type use in which the direct sounds propagated from the external as sound waves are to be recorded. The recorded content is stored in a memory inside the PC first, and it is impossible to transmit the detected speech directly to the third person in real time.

Also, there exists a conference recording system for recording the content of the conference and reproduce or search that later on, but it only records the discussion on a prescribed topic over a prescribed period of time under the stiff circumstance.

In such a circumstance, there is a proposition of a system in which a user wearing a headset with a radio communication function can communicate and record the digitized speech in real time and utilize the recorded data effectively later on. There is a proposition of a technique by which a user wearing a headset with a radio communication function can control a device by speech commands in real time, and communicate and record speech data such as those of the dictation in real time.

Such a headset system enables a user to carry out the communication, recording and device controlling under a free situation without having the user's action restricted, because it is wireless. Also, the user's speeches are picked up by a microphone, transmitted in a digitized form and record, so that it is possible to communicate and store the clear speeches with little noises superposed thereon. The recorded data have hardly any degradation so that they are suitable for preservation, copying, direct text formation, searching, etc.

However, along with these merits, there arises a need to cope with newly created problems such as unauthorized reproduction, unauthorized utilization, disclosure, alteration, etc. In particular, in the case of introducing the above described headset system into highly secret conferences or medical practices, there is a need to secure the protection of the privacy and the secrecy of the recorded data.

Also, there is a need for a headset system with a high level of security such that the recorded data will not be used maliciously and the headset itself will not be used in illegitimate ways.

Also, there is a need for a technique for simplifying search and reproduction while surely protecting the secret of the recorded content in order to effectively utilize the recorded data later on.

Also, in the case of utilizing the recorded content as an evidence later on, it is preferable for the recorded content to have a value as an evidence equivalent to the documentary records or the like.

In addition, if the constant communication and constant recording are presupposed, it can be easily expected that there are cases where it is not desired to record or to be recorded, or it is recorded but it is not desired to be reproduced, depending on circumstances. Consequently, there is also a need for a technique to control the recording and the reproduction in such cases.

In addition, there is also a need to account for the emotional factors such as a desire for hearing, a desire for not hearing, a willingness for hearing, a desire for not allowing others to hear, a desire for making others to hear, etc.

BRIEF SUMMARY OF THE INVENTION

It is therefore an object of the present invention to provide a headset with a radio communication function capable of enabling constant communication and constant recording under totally free circumstances while increasing the evidential value of the recorded content, and a communication recording system using such a headset.

It is another object of the present invention to provide a headset with a short range radio communication function capable of surely protecting the privacy of the conversation content by setting various types of conditions regarding the recording and reproduction processings.

It is another object of the present invention to provide a headset with a radio communication function capable of searching, reproducing and utilizing the recorded information easily and surely, and a communication recording system using such a headset.

It is another object of the present invention to provide a headset with a radio communication function in which the security is guaranteed such that the recorded data will not be used maliciously and the headset itself will not be used maliciously, and a communication recording system using such a headset.

It is another object of the present invention to provide a headset system capable of controlling the communication, recording and reproduction according to the state of the wearer of the headset, by accounting for the human emotional aspects such as a desired for hearing, a desired for not hearing, a willingness for hearing, a desire for not allowing others to hear, a desired for making others to hear, etc., while presupposing the constant communication.

According to one aspect of the present invention there is provided a headset with a radio communication function, comprising: a microphone configured to detect a speech of a wearer and generate a first speech signal; a transmission and reception unit configured to transmit the first speech signal by a short range radio communication, and receiving a second speech signal returned in response to the first speech signal by the short range radio communication; a time information acquisition unit configured to acquire a time information indicating occurrence times of the first speech signal and the second speech signal; an information production unit configured to produce a recording information to be stored in which the time information is set in correspondence to the first speech signal and the second speech signal; and a memory unit configured to store the recording information produced by the information production unit.

According to another aspect of the present invention there is provided a headset with a radio communication function, comprising: a microphone configured to detect a speech of a wearer and generate a first speech signal; a transmission and reception unit configured to transmit the first speech signal by a short range radio communication, and receiving a second speech signal returned in response to the first speech signal by the short range radio communication; a recording permission information memory unit configured to store conditions under which a recording is permitted; a recording permission judgement unit configured to judge whether the recording of the first speech signal and the second speech signal should be carried out or not, by referring to the recording permission information memory unit; and an information production unit configured to produce a recording information to be stored according to the first speech signal and the second speech signal, when the recording permission judgement unit judges that the recording should be carried out.

According to another aspect of the present invention there is provided a headset with a radio communication function, comprising: a microphone configured to detect a speech of a wearer and generate a first speech signal; a transmission and reception unit configured to transmit the first speech signal by a short range radio communication, and receiving a second speech signal returned in response to the first speech signal by the short range radio communication; a memory unit configured to store the first speech signal and the second speech signal; a reproduction permission information memory unit configured to store conditions under which a reproduction of the first speech signal and the second speech signal is permitted; a reproduction permission judgement unit configured to judge whether the reproduction of the first speech signal and the second speech signal should be permitted or not, by referring to the reproduction permission information memory unit, when there is a request for the reproduction of the first speech signal and the second speech signal.

According to another aspect of the present invention there is provided a communication recording system, comprising: a first headset with a radio communication function; and a second headset capable of carrying out radio communications with the first headset; wherein each one of the first headset and the second headset has: a microphone configured to detect a speech of a wearer of each headset and generate a first speech signal; and a transmission and reception unit configured to transmit the first speech signal of each headset to another headset, and receiving a second speech signal transmitted from the another headset; and at least one of the first headset and the second headset also has: a time information acquisition unit configured to acquire a time information indicating occurrence times of the first speech signal and the second speech signal of each headset; an information production unit configured to produce a recording information to be stored in which the time information is set in correspondence to the first speech signal and the second speech signal of each headset; and a memory unit configured to store the recording information produced by the information production unit.

According to another aspect of the present invention there is provided a communication recording system, comprising: a headset with a radio communication function; and a device capable of carrying out radio communications with the headset; wherein the headset has: a microphone configured to detect a speech of a wearer of the headset and generate a first speech signal; and a transmission unit configured to transmit the first speech signal to the device by a radio communication; and the device has: a reception unit configured to receive the first speech signal from the headset; a speech input unit configured to detect a speech of a person other than the wearer of the headset and generate a second speech signal; a time information acquisition unit configured to acquire a time information indicating occurrence times of the first speech signal and the second speech signal; an information production unit configured to produce a recording information to be stored in which the time information is set in correspondence to the first speech signal and the second speech signal; and a memory unit configured to store the recording information produced by the information production unit.

According to another aspect of the present invention there is provided a communication recording system, comprising: a first headset with a radio communication function; a second headset capable of carrying out radio communications with the first headset; and a device capable of carrying out radio communications with the first headset and the second headset; wherein each one of the first headset and the second headset has: a microphone configured to detect a speech of a wearer of each headset and generate a first speech signal; and a transmission and reception unit configured to transmit the first speech signal of each headset to another headset, and receiving a second speech signal transmitted from the another headset; and the device has: a time information acquisition unit configured to acquire a time information indicating occurrence times of the first speech signal and the second speech signal of each headset; an information production unit configured to produce a recording information to be stored in which the time information is set in correspondence to the first speech signal and the second speech signal of each headset; and a memory unit configured to store the recording information produced by the information production unit.

According to another aspect of the present invention there is provided a headset system, comprising: a first headset with a radio communication function; and a second headset capable of carrying out radio communications with the first headset; wherein each one of the first headset and the second headset has: a microphone configured to detect a speech of a wearer of each headset and generate a first speech signal; a transmission and reception unit configured to transmit the first speech signal of each headset to another headset, and receiving a second speech signal transmitted from the another headset; and a state selection unit configured to enable the wearer of each headset to select a desired communication state; and the first headset also has: a control method determination unit configured to determine a control method for communications between the first headset and the second headset, using inputs of a first desired communication state selected at the state selection unit of the first headset and a second desired communication state selected at the state selection unit of the second headset and transmitted to the first headset, according to a combination of the first desired communication state and the second desired communication state; and an execution unit configured to execute operations according to the control method determined by the control method determination unit.

Other features and advantages of the present invention will become apparent from the following description taken in conjunction with the accompanying drawings.

BRIEF DESCRIPTION OF THE DRAWINGS

FIG. 2 is a block diagram showing a configuration of a communication recording system using a headset with a radio communication function according to the first embodiment of the present invention.

FIG. 3 is a block diagram showing one modified configuration of a communication recording system using a headset with a radio communication function according to the first embodiment of the present invention.

FIG. 10 is a diagram showing an exemplary text information recorded in the communication recording system of FIG. 8.

FIG. 11 is a block diagram showing a configuration of a communication recording system using a headset with a radio communication function according to the fourth embodiment of the present invention.

FIG. 12 is a block diagram showing a modified configuration of a communication recording system using a headset with a radio communication function according to the fourth embodiment of the present invention.

FIG. 13 is a diagram showing examples of a recording permission information used in the communication recording system of FIG. 11 or FIG. 12.

FIG. 16 is a diagram showing examples of a reproduction permission information used in the communication recording system of FIG. 15.

FIGS. 18A and 18B are a block diagram in two parts showing an exemplary case in which a reproduction is permitted according to a reproducing person, in the communication recording system of FIG. 15.

FIGS. 20A and 20B are a block diagram in two parts showing an exemplary case in which a reproduction is permitted according to a recorded content, in the communication recording system of FIG. 15.

FIGS. 22A and 22B are a block diagram in two parts showing an exemplary case in which only a section containing a prescribed keyword is reproduced, in a modified configuration of a communication recording system according to the sixth embodiment of the present invention.

FIG. 28 is a diagram showing an exemplary speech communication state table used in the headset system of FIG. 27.

FIGS. 29A and 29B are diagrams showing exemplary input judgement table and speech output judgement table used by two headsets in the headset system of FIG. 27.

DETAILED DESCRIPTION OF THE INVENTION

Referring now to FIG. 1A to FIG. 29B, the embodiments of the present invention will be described in detail.

(First Embodiment)

Figure 1A:
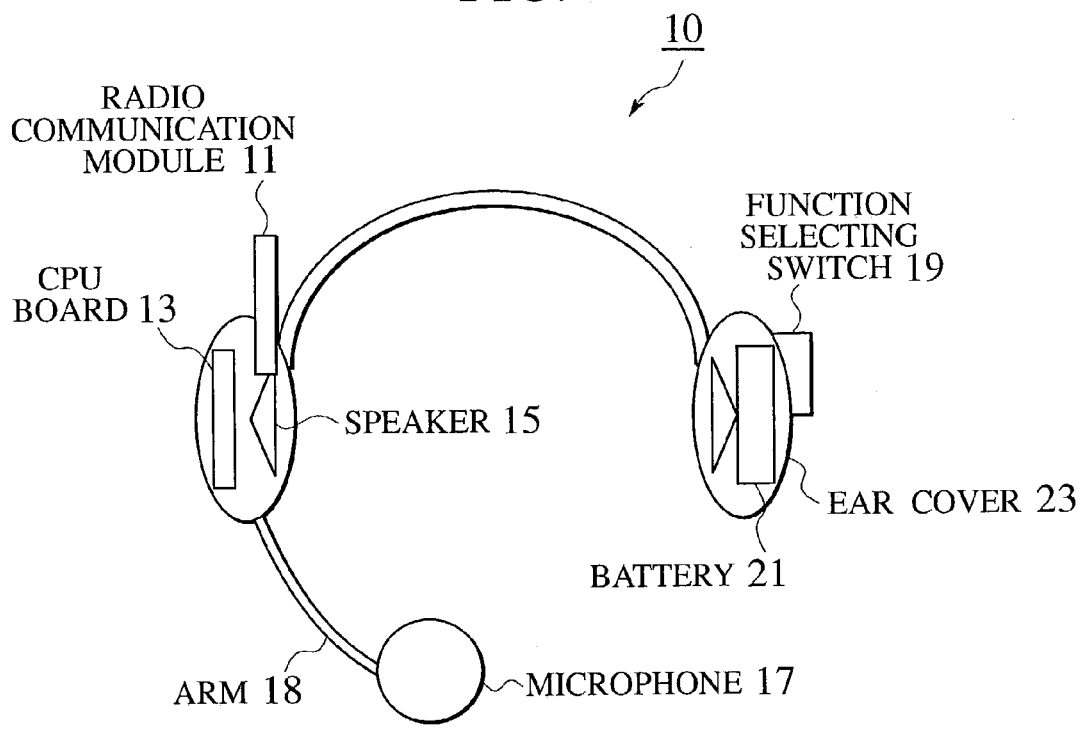
FIGS. 1A and 1B are diagrams showing two exemplary outward appearances of a headset with a radio communication function according to the first embodiment of the present invention.
Figure 1B:
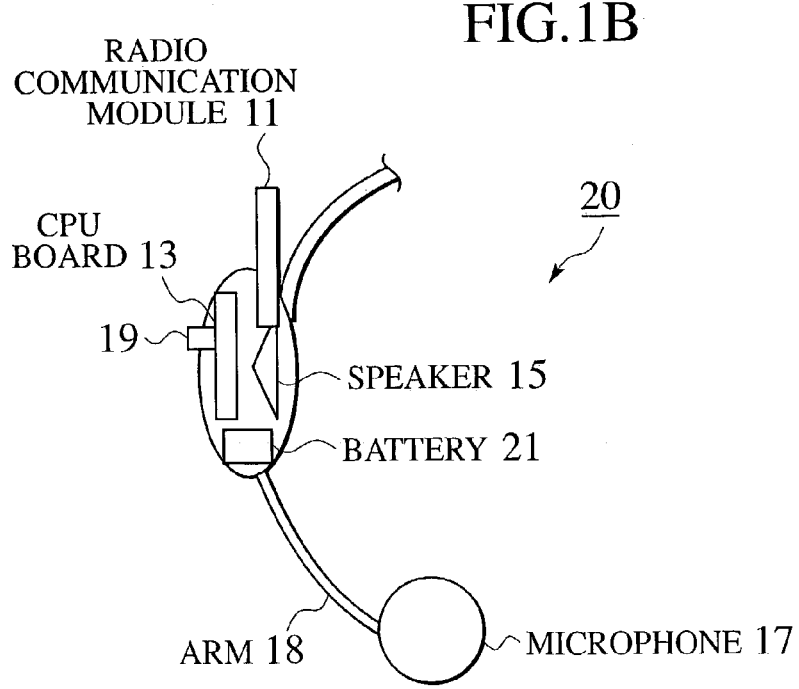

FIGS. 1A and 1B show the outward appearance of a headset with a radio communication function according to the first embodiment of the present invention. FIG. 1A shows a headset 10 to be worn on both ears, and FIG. 1B shows a headset 20 to be worn on one ear. Either type of headset has a microphone 17 for detecting the speech uttered by the wearer (user) and generating a first speech signal, a radio communication module 11 for transmitting the first speech signal by a short range radio communication and receiving a second speech signal returned from another headset wearer in response to the first speech signal by a short range radio communication, a CPU board 13, and a speaker 15 for outputting the received speech or the reproduced speech.

The headset also has a function selecting switch 19 for changing and selecting various modes to be described below. The ear covers 23 are connected through a flexible frame, and supported by the user's head. An arm 18 is extending from one ear cover 23, and a microphone 17 is attached at an end of the arm 18. The microphone 17 is provided at such a position that it is located near the mouth of the user when the user wears the headset 10 (or 20), and detects the speeches with little surrounding noises superposed thereon.

In the ear cover 23, the speaker 15, the CPU board 13, the radio communication module 11 and the battery 21 are incorporated. Note that, although not shown in the figure, these elements are connected through cables or the like according to the need.

Such a headset 10 or 20 with the radio communication function carries out the short range radio communications such as the radio communications according to the Bluetooth specification. In the case of the Bluetooth, the data transmission of 1 Mbits per second is possible by utilizing the radio waves in the 2.4 GHz band. The data connection between the same Bluetooth devices is made automatically, so that there is an advantage in that, in the terminals having the Bluetooth function, the connection is completed by simply placing them nearby, without carrying out any special operation to make the connection. Also, the authentication function is provided so that there is no possibility to have a network connection with the other unknown person's device against the user's will. The headset utilizing the Bluetooth can transmit or receive the speech signals at the sampling frequency of 8 kHz, 16 kHz, 22.05 kHz or 44.1 kHz by making the setting, for example. However, the present invention is not limited to the headset according to the Bluetooth specification, and intended to be applicable to the headset with the radio communication function in general.

FIG. 2 shows a system configuration of a communication recording system formed by using the headset of FIG. 1A or 1B. This system presupposes the basically constant recording, that is, the recording is made automatically while the user wears the headset and carries out communications. The communication may be started by turning a power switch ON at a time of wearing the headset, or may be automatically started by using a temperature sensor or the like when the headset is worn.

A CPU board 13 contains a speech detection unit 36 for converting a first speech signal generated by the microphone 17 into digital signal, a decoding unit 39 for decoding a second speech signal transmitted from a second headset 10B and received by the radio communication module 11, and a clock unit 33 for acquiring occurrence times of the first and second speech signals. For the clock unit 33, a standard clock function is used, for example.

The first speech signal digitized by the speech detection unit 36 and the received and decoded second speech signal are inputted into an information production unit 35. The information production unit 35 produces a recording information by relating a time information obtained by the clock unit 33 to the first and second speech signals. At this point, the information production unit 35 extracts keywords from the first and second speech signals. Although not shown in FIG. 2, the headset also has a keyword memory unit, in which keywords according to the usage of the headset is stored in advance. The information production unit 35 refers to the keyword memory unit, and when the keywords are contained in the first or second speech signal, these keywords are extracted. By extracting keywords, at a time of reproducing the recorded speech later on, it becomes easier to carry out a search by inputting the keywords in form of speech or text.

A memory unit 31 stores the first and second speech signals that are set in correspondence to the time information. In the example of FIG. 2, the conversation contents exchanged between the headsets 10A and 10B are stored into the memory unit 31 in forms of digital speech signals, so that it can deal with the long term recording. Also, the speech data may be recorded in compressed form by using appropriate compression technique. The memory unit 31 can be a built-in component of the headset, or a detachable component.

The second speech signal from the headset 10B is also inputted into a speech reproduction unit 37. The received second speech signal is converted into an analog signal by the speech reproduction unit 37 and outputted from the speaker 15. Consequently, the user who wears the headset 10A carries out the conversation with the user of the headset 10B through the radio communication, and at the same time, the conversation contents are recorded into the memory unit 31 inside the headset in real time.

The recorded contents can be reproduced later on by operating the function selecting switch 19 of FIG. 1A, for example. Also, in the case of using a detachable memory card (SD card, for example) for the memory unit 31, they can be reproduced by the other devices. The conversation contents are recorded in relation to the time information (including year, month, day), so that the search at a time of the reproduction becomes easier, and the record has a high evidential value. Also, the keywords in the conversations are extracted, so that the search can be carries out easily by inputting the keyword in form of speech at a time of the search, for example.

Also, although not shown in the figure, it is also possible to provide an encryption/decryption unit on the CPU board 13. In this case, the reliability regarding the storing and the utilization of the recorded information can be made higher, and the privacy protection can be realized.

Note that, in the case of transmitting the first speech signal from the headset 10A to the headset 10B, the signal after the digital conversion at the speech detection unit 36 is encoded by an encoding unit 38, and transmitted by radio from the radio communication module 11, where the encoding unit 38 and the decoding unit 39 are usually built-in components of the radio communication module 11.

In the example of FIG. 2, only the headset 10A among the two headsets has the clock unit 33, the information production unit 35 and the memory unit 31, and it suffices for at least either one of them to have these constituent elements, and of course it is also possible for both of the headsets 10A and 10B to these constituent elements. Also, the clock unit 33 can be provided in a form of a radio clock using reference radio signals on which the time information is conveyed, as will be described below. In this case, there is a need for a separate antenna for receiving the reference radio signals. In the case of using the radio clock, the accuracy of the time is guaranteed, and the illegal utilization of the recorded contents by illegally changing the time can be prevented.

FIG. 3 shows a modified embodiment in which the communication recording system using the headset of FIG. 2 is modified as follows. In the system of FIG. 3, both the headsets 40A and 40B with the radio communication function have the clock units, and the reliability of the time information is improved by comparing and adjusting either one of these two times.

The second speech signal generated by the microphone 17 of the second headset 40B is encoded along with the second time information obtained by the clock unit 33 of the second headset 40B, and transmitted by radio to the first headset 40A. At the first headset 40A, the first time information is also obtained independently by the clock unit 33. The first time information and the second time information are inputted into a clock adjustment unit 45 of the first headset 40A. The clock adjustment unit 45 compared the first time information and the second time information, and when they are identical or within a tolerable error range, the first time information and the second time information are supplied to the information production unit 35 as the correct information. When the two time informations do not coincide, a correction is urged by using an alarm, for example.

In the example of FIG. 3, only two headsets are shown, but the communication recording system using the headset with the clock adjustment function is particularly effective in the case of discussions by many people as in the conference. In this case, the clock adjustment unit 45 compared the time informations inputted from all the headsets, and when the majority of the time informations coincide, this is supplied to the information production unit 35 as a proper time information. In this way, the evidential value of the recorded contents can be improved further.

Figure 4:
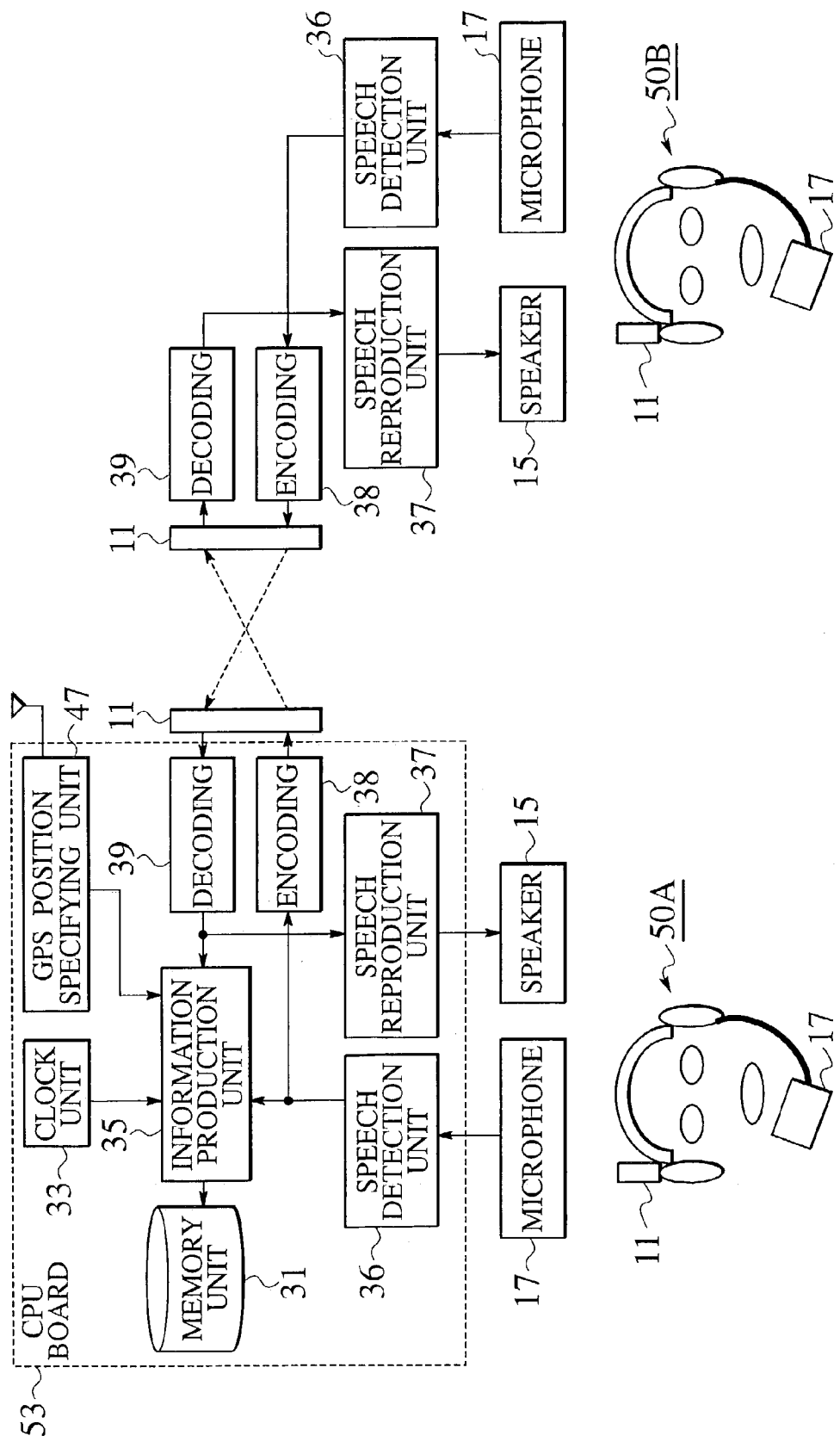
FIG. 4 is a block diagram showing another modified configuration of a communication recording system using a headset with a radio communication function according to the first embodiment of the present invention.

FIG. 4 shows another modified embodiment in which the communication recording system using the headset of FIG. 2 is modified as follows. The headset 50A with the radio communication function has a position specifying unit 47 for acquiring the position information, by utilizing the GPS, for example, in addition to the clock unit 33. The GPS is a system developed in the United States as a navigation assistance for airplanes, ships, etc. Tis system comprises 24 GPS satellites orbiting at 20,000 km high (four satellites are provided on each of the six orbital planes), a control station for tracking and controlling the GPS satellites, and a user's receiver for carrying out a position measurement. In the headset of this embodiment, the own position is determined by learning distances from four or more GPS satellites simultaneously similarly as done by the airplanes, ships, etc. The distance from the GPS satellite is obtained from a time taken by the radio signal transmitted from the GPS satellite to reach the receiver.

The position information obtained by the position specifying unit 47 is inputted into the information production unit 35 along with the time information. The information production unit 35 produces the information to be stored by relating the time information and the position information to the first speech signal of the user detected at the headset 50A and the second speech signal of another user transmitted from the headset 50B. The memory unit 31 stores the speech signals with the time information and the position information attached thereto.

In such a configuration, the time and the place can be identified along with the conversion contents, so that the evidential value of the conversation contents can be improved further.

The communication recording system of the first embodiment is effective for a group inspection in which an individual has a wider action range, and for a report production. It is also expected to be applicable to a medical practice or an outdoor group education. For example, in the case of the home nursing, the visiting caretaker and the patient can both wear the headsets and the caretaking record can be produced, where the caretaker has many activities to do so that it is desirable to have the automatic recording of the conversations with the patient by wearing the headset which can leave both hands free. The time information is attached to the recorded content so that the record has a high evidential value, and the reliability of the caretaking can be improved. Also, by using the additional headsets, it is possible to have the participation of the third person such as a nurse or an attendant, so as to increase the evidential value even higher.

(Second Embodiment)

Figure 5:
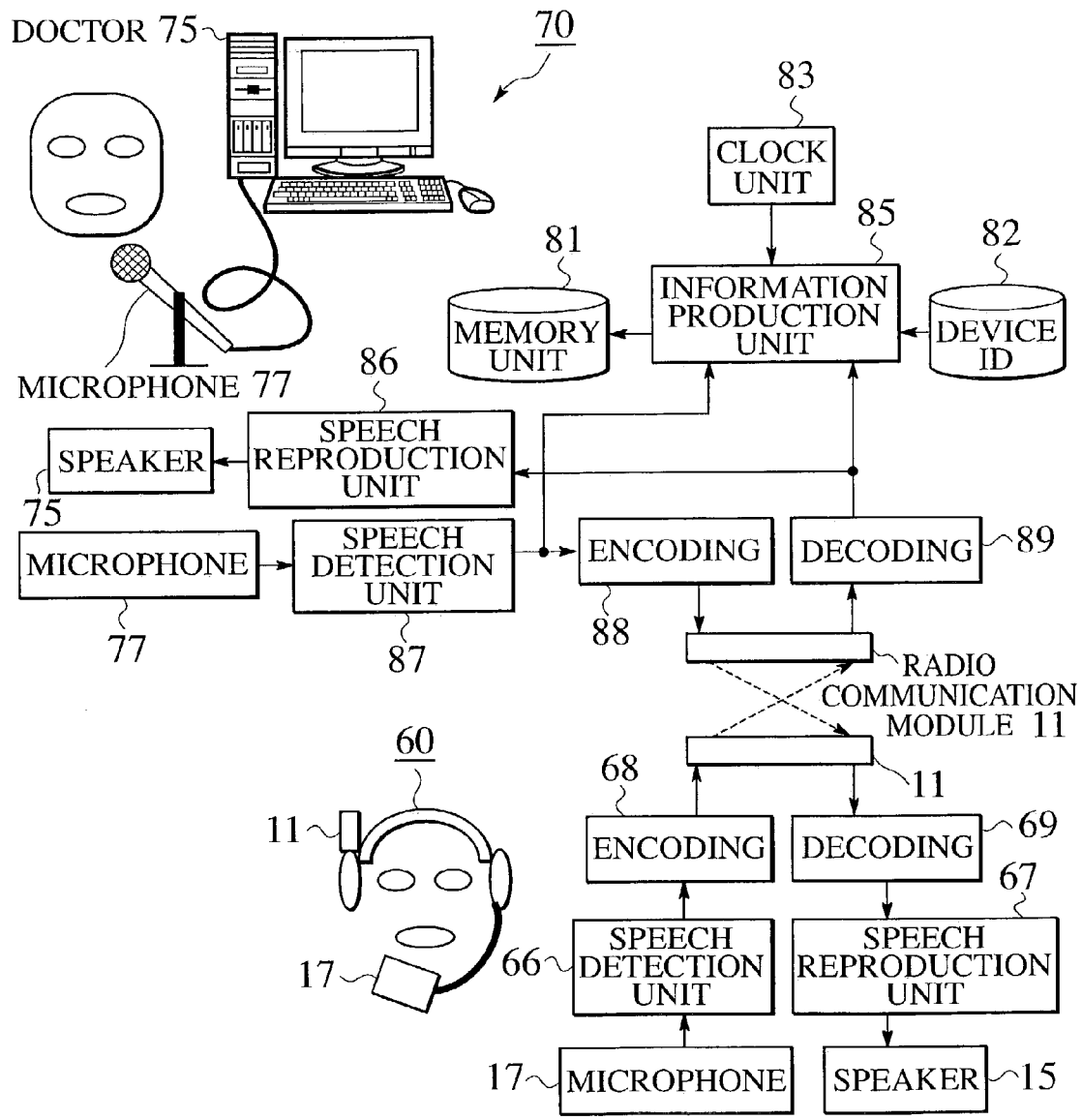
FIG. 5 is a block diagram showing a configuration of a communication recording system using a headset with a radio communication function according to the second embodiment of the present invention.

FIG. 5 shows the communication recording system using the headset with the radio communication function according to the second embodiment of the present invention. In the second embodiment, the system is formed by combining an external device and the headset with the radio communication function. In the example of FIG. 5, the communication recording system is formed by one headset 60 with the radio communication function and one external device 70. The device 70 is assumed to be a fixed device with the Bluetooth function (which will be referred to as a BT device hereafter), for example.

The headset 60 has a microphone 17 for detecting the speech of the wearer (user) and generating a first speech signal, a radio communication module 11 for transmitting the first speech signal to the BT device 70 by radio and receiving a second speech signal transmitted from the BT device, and a speaker 15 for outputting the second speech signal in a form of the speech.

The BT device 70 has a microphone 77 as a speech input unit. In the example of FIG. 5, the microphone 77 is connected to the BT device 70 by a cable, but it may be a wireless microphone. In the case of the wireless microphone, the user's freedom of actions can be enhanced to improve the convenience.

The BT device 70 also has a radio communication module 11 for carrying out radio transmission/reception with the headset 60, a speech detection unit 87 for converting the second speech signal generated by the microphone 77 into digital signal, and a clock unit 83. The first speech signal received from the headset and the second speech signal generated by the microphone 77 are inputted into the information production unit 85. The time information acquired by the clock unit 33 and the device ID of the headset are also inputted into the information production unit 85. The information production unit 85 produces the information to be stored by setting the time information and the device ID in correspondence to the first and second speech signals. The produced information is stored into the memory unit 81.

Figure 6:
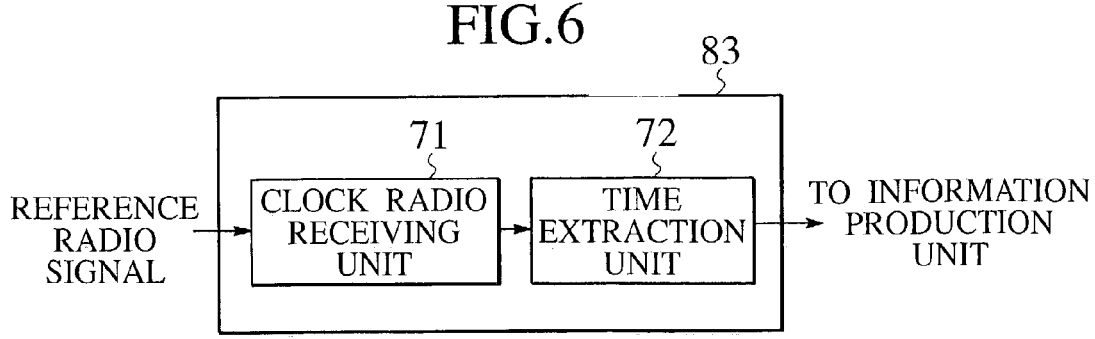
FIG. 6 is a block diagram showing a configuration of a clock unit using a radio clock in the communication recording system of FIG. 5.

The clock unit 83 is a radio clock using the reference radio signals as shown in FIG. 6, for example. The radio clock receives the reference radio signals on which the time information is conveyed at a built-in antenna (clock radio receiving unit) 71 of a ultra high performance, and extract and correct the time at a time extraction unit 72. In Japan, the reference radio signals are transmitted by conveying the accurate time based on the atomic clock, from the "Mount Ootakayado reference radio signal transmission station". The atomic clock of the transmission station is linked by a remote control with the Japanese standard time produced by an atomic clock of the Japanese standard time group at the communications research laboratory (Koganei, Tokyo) which is the radio clock independent executive agency.

The time extraction unit 72 amplifies and decodes the time signal received by the antenna 71. By using the clock unit 83 in a form of a radio clock, the clock function of the BT device 70 itself and the headset 60 can be corrected according to the need. Also, as the accurate time is supplied to the information production unit 85, the evidential value of the recorded contents can be improved. Also, as described in the first embodiment, in the case of carrying out the communications and the recording among a plurality of headsets, the radio clock may be used as the clock unit of any one of the headset alone. In this case, the time information of the other headsets can be corrected and coordinated. As a result, the accurate time management is carried out over the entire system, and the reliability (evidential value) of the recorded contents can be improved even further.

Returning to FIG. 5, the by using the BT device 70 of a stationary type, the position of the headset 60 is automatically specified and recorded when the connection with the BT device 70 is made. Namely, although not shown in the figure, the position information is inputted into the information production unit 85 in addition to the time information, to produce the record with a high evidential value.

It is also possible to use the BT device 70 which is not a stationary type, in a form of a mobile terminal such as PDA, for example. In this case, the position information can be acquired by providing the GPS position specifying unit to the mobile terminal.

In addition, it is also possible to provide a memory unit in the headset 60, such that the record produced by the BT device 70 side is received by radio and stored into the memory unit in the headset 60.

The headset system of FIG. 5 is effectively applicable to the medical and educational practices, for example. In the case of the medical practice, the patient receives the headset when the health insurance card is issued, or the headset for a personal use is lent at the admission of the hospital. In the case of using the headset with a memory which can constantly record the conversation contents, the patient and the headset should preferably be in one-to-one correspondence. When the headset has no memory and the conversation contents are to be stored in the BT device of the hospital side, the headset can be lent to arbitrary patient.

The doctor explains the current diagnosis or advises to the patient wearing the headset 60 for personal use, by using the microphone 77, for example. The answers to the questions of the patient and the questions to the patient for the medical examination purpose are also made by using the microphone 77. These communication contents are automatically stored in the memory unit 81 along with the time/position information and the device ID of the patient's headset. When the patient and the headset are not in one-to-one correspondence, the patient ID can be created according to the voiceprint of the patient and stored in advance, such that the patient ID according to the voiceprint can be used instead of the device ID at each occasion of the conversation.

By using this system, the doctor side can obtain a proof of the fact that the proper medical examination was carried out, in a form of the recorded contents, as long as the proper explanation and answers are made. Such recorded contents can be utilized in a lawsuit regarding the medical treatment error or the recorded proof of the informed consent. Also, by using this system, the attitude of the doctor can be improved such that the trust of the patient can be obtained. Also, it becomes possible for the insurance company to introduce a new business in which the premium rate of the insurance against the compensation for damage due to the medical treatment error is lowered for those hospitals which adopt this communication record system.

On the other hand, there are also merits for the patient in that even if the important facts such as the explanation of the diagnosis or the advices from the doctor are missed or forgotten, it is possible to check the recorded contents later on by reproducing them. The time information and the position information are attached to the recorded contents so that the search is also easy. In the case of using the headset for lending to unspecified many rather than the headset for a personal use, the recorded contents as recorded by the stationary BT device in the hospital can be given to the patient by storing them in MD or the like. In addition, there is also a merit in that the waiting states or summons can be checked through the headset. It is possible to obtain information regarding how many other patients are currently waiting for the medical examination before his turn, it is possible to utilize the waiting time effectively. Even if the patient leaves from the waiting room, the summons can be made through the headset so that the patient can feel safe. In addition, in the waiting room, the patient can listen to the music of his own preference that is provided from the BT devices that are provided in many numbers inside the hospital.

In the application to the educational practice, the headset for a personal use is issued to each student at a time of the enrollment. In this exemplary application, the conversation contents of the educational guidance, the academic consultation, the interview, etc., can be stored as the digital data in correspondence to the headset ID of the student and the time/position information. The recorded contents so stored have the high evidential value because the time and the place or the correspondent (student) are identified.

FIG. 5 shows an exemplary case where the patient wears the headset and and the doctor uses the microphone, but it is also possible to use a configuration in which the doctor wears the headset while the microphone is given to the patient who visited the doctor and the conversation contents are recorded in the BT device 70. The configuration of the headset itself becomes simpler so that the headset can be provided in a smaller size and a lighter weight, while the sufficient capacity is provided in the BT device so that the various records can be stored.

When the sufficient capacity is provided on the BT device side, a camera function can be added to one or both of the headset and the BT device. In this case, the conversation contents exchanged through the radio communications and the video information will be stored in correspondence to the time/position information.

Figure 7:
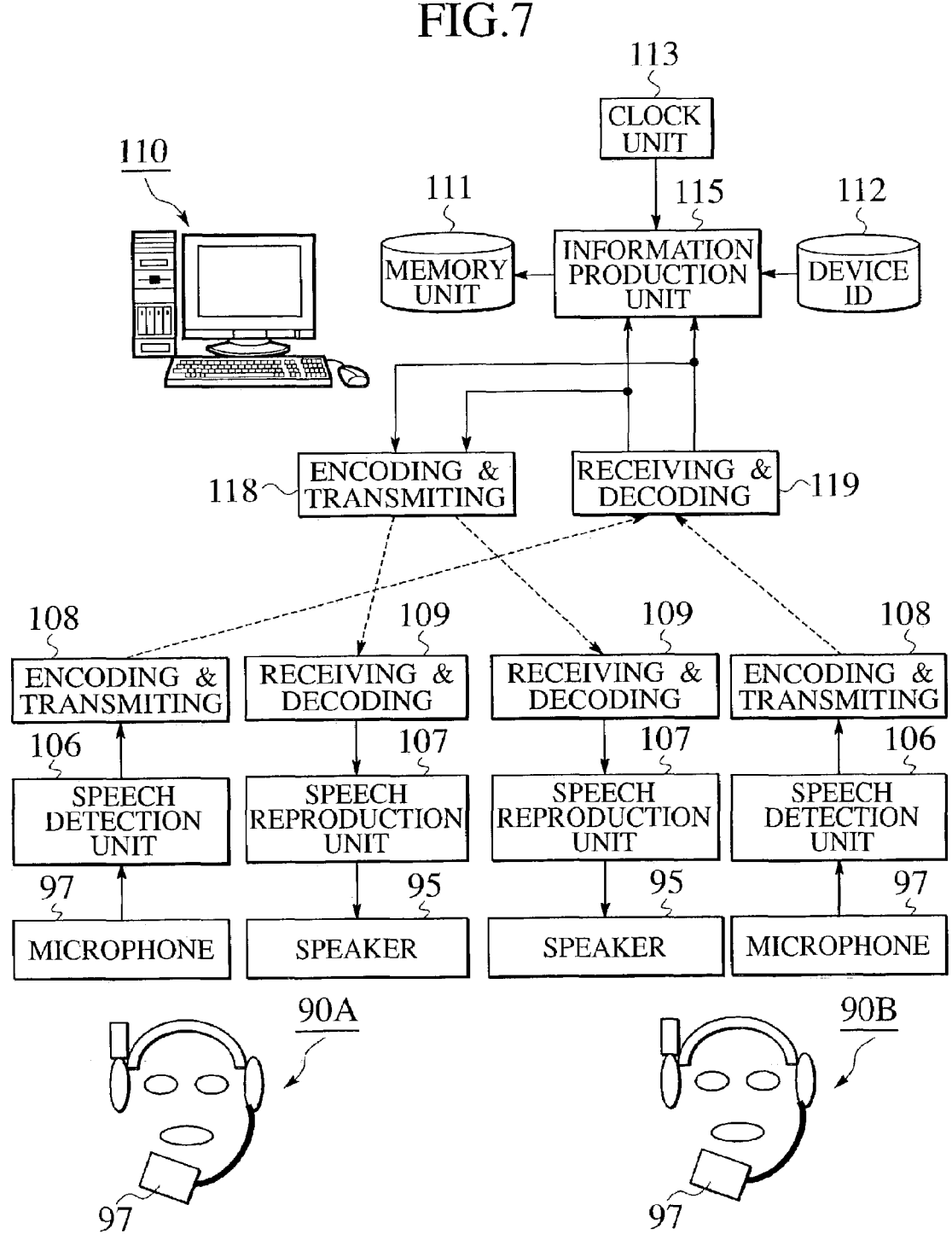
FIG. 7 is a block diagram showing a modified configuration of a communication recording system using a headset with a radio communication function according to the second embodiment of the present invention.

FIG. 7 shows a modified embodiment in which the system configuration of FIG. 5 is modified as follows. The communication recording system of FIG. 7 includes two headsets with the radio communication function and one external device. More specifically, the system of FIG. 7 includes a first headset 90A, a second headset 90B, and a BT device 110 according to the Bluetooth specification which is capable of transmission/reception by the radio communications with these headsets. Each of the first and second headsets 90A and 90B has a microphone 97 for detecting the speech uttered by the wearer (user) and generating the first speech signal, and transmitting and receiving units 108 and 109 for transmitting the first speech signal to the second headset through the BT device 110 and receiving the second speech signal transmitted from the second headset through the BT device 110. The BT device 110 has a clock unit 113 for acquiring the occurrence times of the first and second speeches, an information production unit 115 for producing the information to be stored by setting the first and second speech signals in correspondence to the time information, and a memory unit 111 for storing the produced information.

In the system of FIG. 7, instead of the BT device 70 with the associated microphone 77 used in the system of FIG. 5, the second headset 90B and the BT device 110 are used. Consequently, in the medical practice example, both the doctor and the patient will wear the headsets. The BT device 110 can be a stationary type or a mobile type. The conversations exchanged between the two headsets have the time information attached by the information production unit 115 and stored in the memory unit 111. The system of FIG. 5 is suitable for the interview type conversation recording, whereas in the system of FIG. 7, the number of headset wearers is increased and their action ranges are enlarged. For example, in the application to the rehabilitation practice, it is suitable for the case of recording all the speeches uttered by the doctor who is issuing commands in a separate room in addition to the conversation exchanged between the physiotherapist and the patient, into the stationary type BT device 110 in real time. When the device ID of the headset is recorded in correspondence to the recorded contents, the correspondent can be identified in addition to the time and the place so that the evidential value of the recorded contents can be improved further.

Also, in the application to the home nursing practice, the caretaker and the patient wear the headsets, and it is possible to store the conversation records in the stationary type BT device 100 of the patient's home in real time by the radio communications, instead of storing them in a memory in the headset. Else, the caretaker can bring a mobile terminal and records them in the mobile terminal. As such, the applicable range is wide. In the case of the stationary type device, the position information is automatically obtained when the headset makes the connection to this device, as already mentioned above. Also, similarly as in the system of FIG. 5, a camera function can be added to either headset. In this case, the speech data and the video data can be recorded by using a suitable compression technique.

For example, when the caretaker helps the cared person to change clothes, the video of the cared person's changing clothes can be recorded along with the speech of "we are going to change Mr. Yamada's clothes now". Later on, in the case of carrying out the search by using a keyword "changing clothes", the speech and the video at a time of the recording can be reproduced in addition to the speech recognition result surrounding the "changing clothes" which is the search result.

(Third Embodiment)

Figure 8:
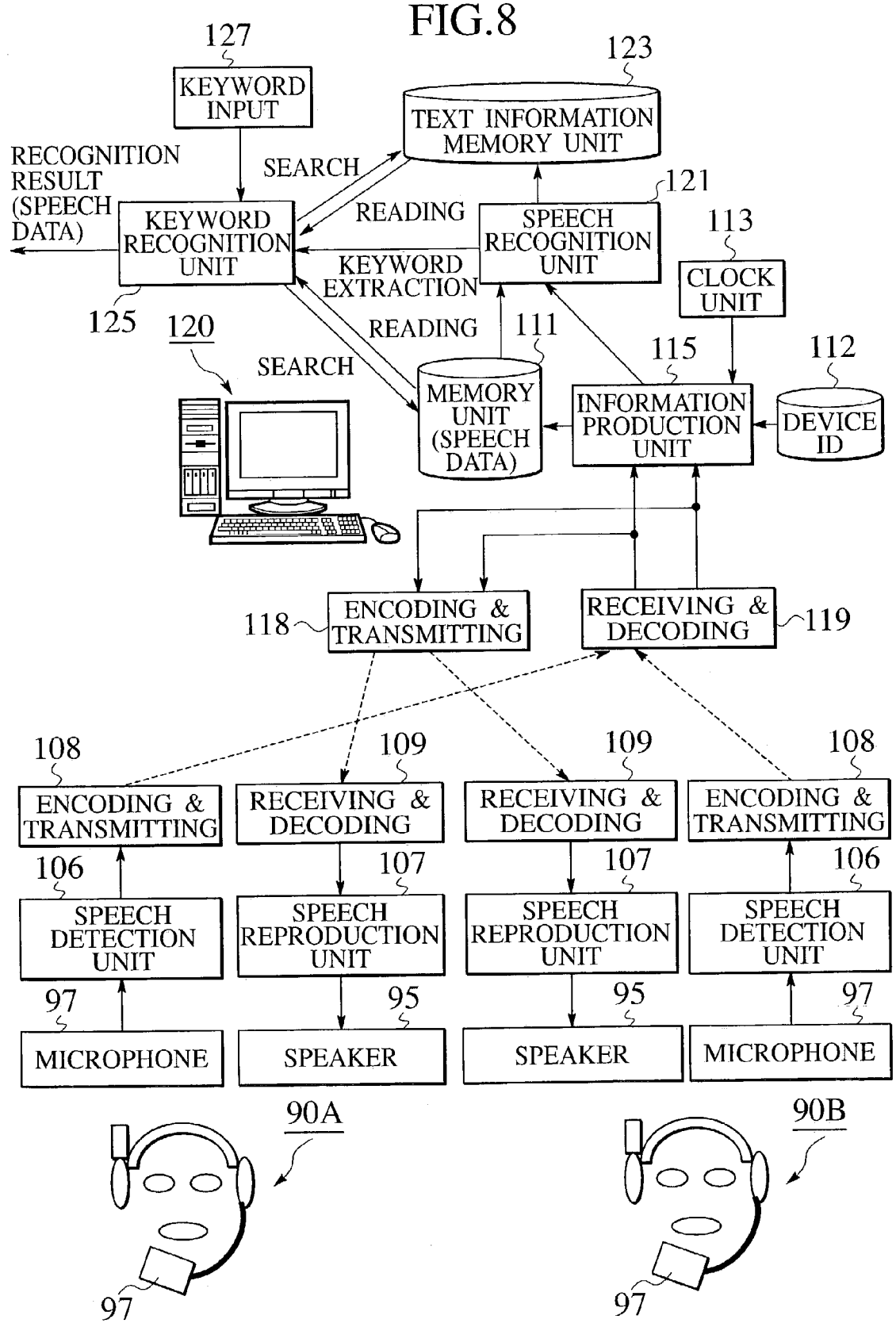
FIG. 8 is a block diagram showing a configuration of a communication recording system using a headset with a radio communication function according to the third embodiment of the present invention.

FIG. 8 shows a configuration of the communication recording system according to the third embodiment of the present invention. In this system, a text conversion function is provided to the system of the second embodiment. FIG. 8 uses a system configuration formed by two headsets and one device as in the system of FIG. 7, but it is also possible to use a system configuration formed by one headset and one device with a speech input function as in the system of FIG. 5.

In the communication recording system of FIG. 8, the device 120 has transmitting and receiving units 118 and 119 for receiving the first and second speeches transmitted by radio from the first and second headsets 90A and 90B and transmitting the received speech to the other headset. The received first and second speeches are transmitted to the other headset and at the same time inputted into the information production unit 115 of the device 120. The first and second speeches are stored in the memory unit 111 in correspondence to the time information obtained by the clock unit 113.

The device 120 also has a speech recognition unit 121 and a text information memory unit 123. The speech recognition unit 121 converts the speech data produced by the information production unit 115 or the speech data stored in the memory unit 111 into text (character strings). The text information memory unit 123 stores the text converted information. Consequently, in the communication recording system of FIG. 8, the conversation contents are simultaneously recorded as the speech and as the text information in real time at the device 120.

The device 120 also has a keyword recognition unit 125, which extracts keywords from the recorded speech and the recorded text. Later on, when the keyword is inputted either by speech or text from a keyword input unit 127, and that keyword is the extracted keyword, the keyword recognition unit 125 searches through the memory unit 111 and the text information memory unit 123, and identifies the desired recording position simply and quickly. The speech or the text at the identified position is reproduced, and displayed on a display screen of the device 120 or outputted from a speaker.

Figure 9:
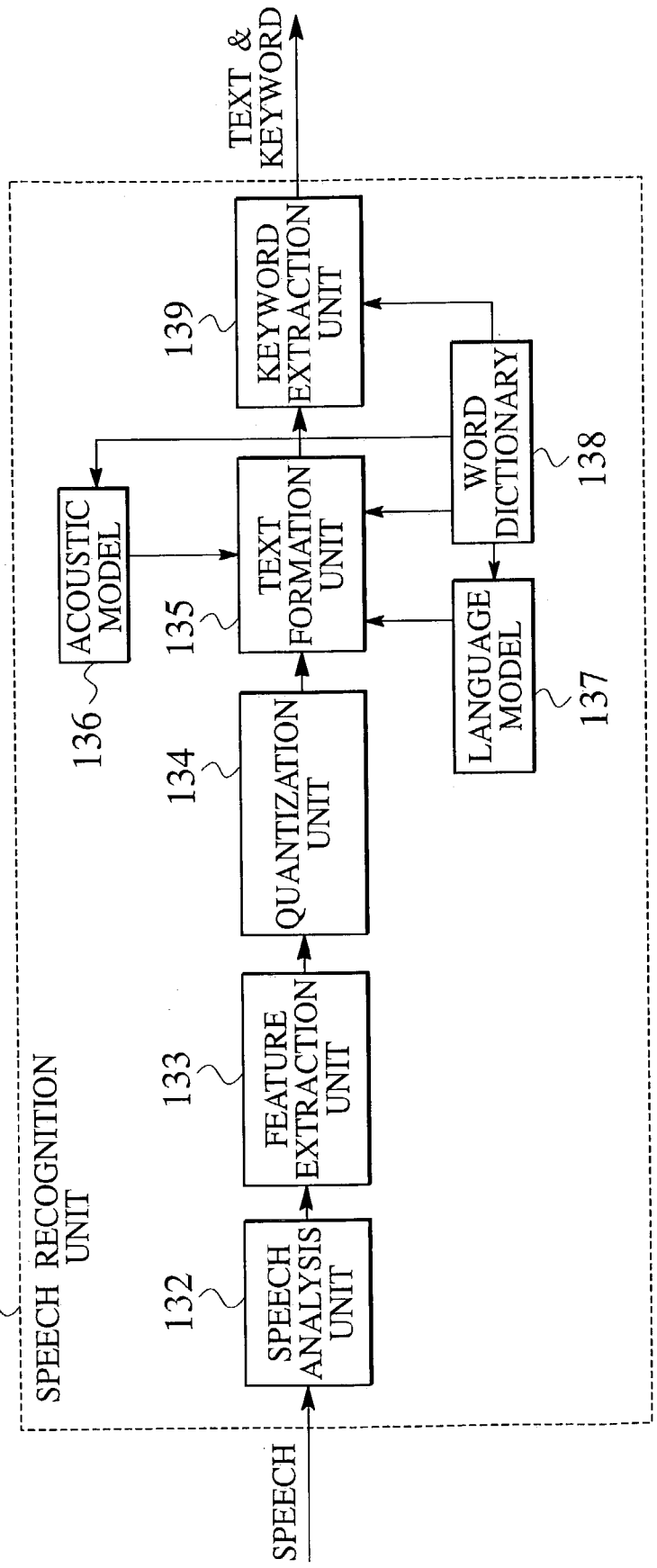
FIG. 9 is a block diagram showing a configuration of a speech recognition unit in the communication recording system of FIG. 8.

FIG. 9 shows a schematic configuration of the speech recognition unit 121 of FIG. 8. At a speech analysis unit 132 and a feature extraction unit 133, the feature parameters are produced from the inputted digital speech data. The inputted digital speech data are digital converted by using prescribed sampling frequency and quantization bits. The speech analysis unit 132 carries out the 512 points FFT analysis using a frame length of 24 ms (humming window) and a frame shift of 8 ms, and the feature extraction unit 133 produces 32 channel BPF group output parameters $x(t, f)$, $f=1$ to 32.

A speech quantization unit 134 outputs a speech segment time series by quantizing the time-frequency pattern in a range of 48 ms while sequentially shifting 8 ms each time. In the third embodiment, 235 types of the speech segments are defined. The speech segment time series can be expressed as consecutive word HMMs formed by the phenome HMMs. Here, the HMM is a left-to-right type SMQ/HMM, and the triphones classified by accounting for the relationship of consecutive phonemes are used for the phoneme HMMs. An acoustic model 136 is an HMM dictionary for the purpose of checking the acoustic similarity of the inputted speech. On the other hand, a language model 137 is a dictionary for the purpose of checking the linguistic similarity, in which information on a likelihood for the consecutive words to be related is stored by using bigrams and trigrams. A text formation unit 135 converts the acoustic parameters into the Japanese text candidate series by using a word dictionary 138 containing 105,000 words, in addition to the acoustic model 136 and the language model 137.

The keyword extraction unit 139 extracts nouns or pronouns, for example, as the keywords for the search, according to the parts of speech. For example, when the caretaker wearing the headset 90A uttered "we are going to change Mr. Yamada's clothes now" into the microphone 97, this speech is automatically recognized and the keywords such as "Yamada", "changing clothes", etc., are extracted.

The extracted keywords are sent to the keyword recognition unit 125, and registered as keywords also in forms of the speech data according to the need. By using the keywords so extracted, the search speed can be made faster. As for those related to the charging for the home nursing service such as "changing clothes" are automatically registered and described in the bill. Of course, the caretaker is required to carry out the final check. Conversely, when it is desired to check the situation under which the changing clothes has actually taken place, the "changing clothes" is inputted either by speech or text from the keyword input unit 127 and the search is carried out, then, the phrase "we are going to change Mr. Yamada's clothes now" surrounding the "changing clothes" is immediately searched and reproduced. The keyword recognition unit 125 searches through the memory unit 111 and the text information memory unit 123 according to the way by which the keyword is inputted, i.e., according to whether it is the text input or the speech input.

FIG. 10 shows an exemplary character strings stored in the text information memory unit 123. The conversation contents exchanged by the caretaker wearing the headset 90A (device ID 400001) and the cared person wearing the headset 90B (device ID 800001) are converted into text, and stored along with the time information. The waveforms corresponding to the text converted character strings are waveforms detected as sound waves by the microphone 97 of the headset 90, which are not stored in the text information memory unit 123 but shown in FIG. 10 in order to indicate the correspondence relationship.

In the system of FIG. 8 and FIG. 9, the speech recognition unit is used at a time of recording, and the inputted speech is stored also as text. However, it is also possible to store only the speech data, and activates the speech recognition unit at a time of reproducing so as to reproduce the character strings.

In such a communication recording system, the conversation contents exchanged by the radio communications are recorded in real time as the speech data and at the same time they are also recorded as text, so that the usefulness of the recorded contents is high.

Also, by extracting the keywords, the search becomes easier.

(Fourth Embodiment)

FIG. 11 and FIG. 12 show the headset with the radio communication function and the communication recording system using this headset according to the fourth embodiment of the present invention. In the fourth embodiment, at a time of recording the conversation contents, the recording is carried out only when there is a consent or a permission for the recording. FIG. 11 shows an example in which the side to be recorded (the user wearing the headset 140B) has a right to decide the recording permission, and FIG. 12 shows an example in which the recording side (the user wearing the headset 160A) has a right to device the recording permission.

The present invention presupposes that, when the headset is worn and the communications are started, the communication contents (conversation contents) are automatically recorded. However, depending on the circumstances and the conversation contents, there are cases where the recording is not desirable. There is no problem when there is a consent for the recording in advance between the users who exchanged the conversations, but otherwise the problem of the privacy violation may arise, for example.

As a method for obtaining a consent for the recording, there is a method in which the user is regarded as having consented when a specific headset is worn. For example, while the patient is wearing the headset, the patient is regarded as having no objection to record the speeches uttered and inputted during that time. In this case, in the example shown in FIG. 11, the recording indication unit of the headset 140A of the doctor is activated at a timing where the patient has worn the headset 140B. Upon seeing this, if the patient consents to the recording, the patient can just carry out the conversations through the headset. If the patient cannot consent, the patient requests the stopping of the recording.

The second method is to obtain the consent for the recording in advance and registering it for the specific person, place, and time, at the recording side. FIG. 11 and FIG. 12 shows the system configuration for realizing this second method.

In the exemplary application to the medical practice, in FIG. 11, the headset 140B to be worn by the patient has a permission information memory unit 153 and a recording permission judgement unit 151. The permission information memory unit 153 stores the recording permission information as exemplary shown in FIG. 13, for example. It is assumed that the permission information memory unit 153 can write the recording permission information suitably through an input unit not shown in the figure. The recording permission judgement unit 151 refers to the permission information memory unit 153, judges whether the recording of the conversation contents should be permitted or not, and transmits the judgement result by radio automatically to the headset 140A of the doctor.

For example, in an example of a part (a) of FIG. 13, the condition for permitting the recording only the conversations with the doctor B regardless of time and place is set to the headset 140B of the patient. Here, "*" indicates that no particular condition is set. In order to specify that the correspondent is the doctor B, the connection state with respect to the headset of the doctor B can be used. Namely, when the headset 140B of the patient started the communication with the headset 140A with the device ID 100001 that is worn by the doctor B, it is automatically judged that the recording of this communication content is permitted, and the judgement result is transmitted by radio to the headset 140A of the doctor. At the headset 140A of the doctor, upon receiving the judgement that the recording is permitted, the recording of the conversation contents is started automatically. At this point, the headset 140B of the patient side indicates that the recording is permitted, by using a green lamp, for example. On the other hand, the headset 140**A of the doctor indicates that the recording is carried out.

In the case where the same patient receives the diagnosis of the doctor C other than the doctor B, the recording permission judgement unit 151 refers to the permission information memory unit 153, and automatically judges that the recording of this conversation should not be permitted according to the device ID of the headset of the doctor C. In this case, the permitted indication display unit 146 of the headset 140B of the patient is not activated, so that the lamp is not turned on, for example. The judgement result is transmitted by radio to the headset of the doctor C, so that the headset of the doctor C will not carry out the recording of the conversation with this patient.

As in a part (b) of FIG. 13, it is also possible to register the permission of the recording for the conversations with all the physicians of the hospital A regardless of time and place. In this case, similarly, whether the recording is permitted or not is automatically judged according to the connection with the device ID of the headset worn by each physician, and the judgement result is sent to the headset of the physician while the display state of the permitted indication display unit is controlled.

Similarly, in an example of a part (c) of FIG. 13, the permission of the recording only when the patient entered the medical ward of the hospital A regardless of time and correspondent is registered. In the case where the stationary type BT device (FIG. 8) is provided in the medical ward of the hospital A as described in the second embodiment, the position information is automatically detected as the headset 140B of the patient is connected to this device, and the judgement of the recording permission is carried out at the recording permission judgement unit 151. The judgement result is transmitted by radio to the headset 140A of the doctor and the permitted indication display unit 146 of the headset 140B of the patient is turned on.

In an example of a part (d) of FIG. 13, the recording is permitted when the patient entered the hospital A. In this case, the position information is detected when the connection with the stationary type BT device provided in the hospital A or two or more headsets worn by the hospital workers is established, and it is judged that the recording is permitted.

In an example of a part (e) of FIG. 13, the condition for permitting the recording of the conversation contents for three months from December 20 in the medical ward of the hospital A is set. It is also possible to add a period until the treatment ends by the AND condition to the three month period from December 20 as a time condition as in a part (f) of FIG. 13, and it is possible to add a period until the treatment ends by the OR condition to the three month period from December 20 as a time condition as in a part (g) of FIG. 13.

In this way, by recording according to the consent, the credibility and the evidential value of the recorded contents can be improved considerably.

It is of course also possible to permit the recording for some specific acts by the law, for example, without requiring to check whether the recording is consented or not. In this case, the recording indication display unit 144 of the headset 140A of the doctor is turned on in red, but if the patient did not mind it and carried out the conversation, the conversation content is recorded.

In the example of FIG. 12, the headset 160A of the recording side has a permission information memory unit 173 and a recording permission judgement unit 171. Namely, the headset 160A has a microphone 167 for detecting the speech of the wearer and generating the first speech signal, transmitting and receiving units 178 and 179 for transmitting the first speech signal to the second headset 160B by a short range radio communication and receiving the second speech signal returned from the second headset 160B, the permission information memory unit 173 for storing the conditions under which the recording is permitted, the recording permission judgement unit 171 for judging whether the first and second speech signals should be recorded or not by referring to the permission information memory unit 173, and an information production unit 175 for producing the information to be stored according to the first and second speech signals when the recording permission judgement unit 171 permitted the recording.

In the system of FIG. 12, rather than obtaining the permission of the correspondent, the recording of the conversations is permitted only under specific circumstance (specific correspondent, place, time, etc.) at the recording side. For example, when a member of a group belonging to some project carries out conversations with the other members, the conversations are often on topics regarding the project so that the recording is automatically permitted in the case of the conversations with the other members. In this case, similarly as in the case of FIG. 11, the permission information such as those shown in FIG. 13 are stored in advance.

In the headset with the radio communication function and the communication recording system according to the fourth embodiment, the constant communication and the constant recording are presupposed, but whether the recording is permitted under a certain condition or not is judged in consideration of the case where the recording is not desirable. In this way, the privacy of the conversations between the headsets can be protected, and the usefulness of the system can be improved.

(Fifth Embodiment)

Figure 14:
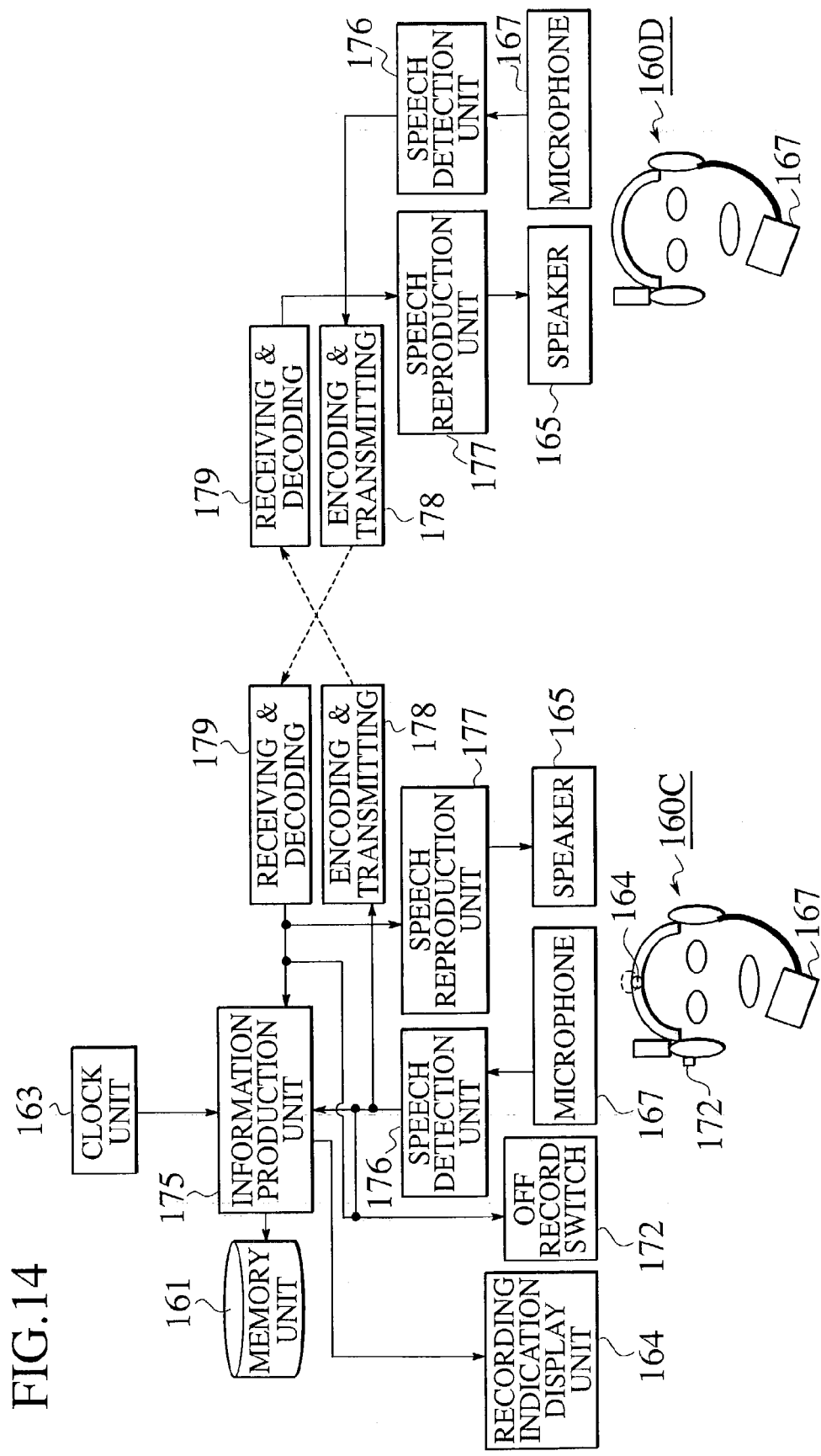
FIG. 14 is a block diagram showing a configuration of a communication recording system using a headset with a radio communication function according to the fifth embodiment of the present invention.

FIG. 14 shows the headset with the radio communication function and the communication recording system using this headset according to the fifth embodiment of the present invention. In the fourth embodiment, the condition such as correspondent, place, time, etc., for permitting the recording is set in advance and whether or not to record the conversation content is judged automatically. In the fifth embodiment, an off the record command is set by the intention of the wearer (user) of the headset when the content to be concealed suddenly arises during the conversation.

For example, during the conversations by a plurality of doctors wearing the headsets with the radio communication function which presuppose the constant recording, when a need to exchange information regarding the privacy of the patient arises, there is a need to conceal that portion. For this reason, the headset 160C according to the fifth embodiment has an off record setting unit in addition to the basic configuration shown in the first embodiment. In an example shown in FIG. 14, the off record setting unit is realized by an off record switch 172 provided on the headset 160C. The user of the headset 160C presses the off record switch 172 when a topic that needs to be concealed arises, and utters the speech in an off record mode. The off record mode is continued until the mode is released by pressing the off record switch 172 again.

The information production unit 175 produces the information to be stored in correspondence to the speech data from the off record mode command and the start time and the end time of the off record mode. For the off record mode command, off record tags are attached before and after a section at which the off record mode is commanded in the speech data. In the off record mode, the speech is recorded as it is but as the off record tags are attached, the off record tags are detected at a time of the reproduction. When the off record tags are detected, the severe reproduction limitation is imposed such that the reproduction is prohibited or the reproduction is carried out only when the person who had the conversations permits.

In the example of FIG. 14, the off record switch 172 is provided only on the first headset 160C that has the recording function, but it is also possible to provide the similar off record switch to the second headset 160D. In this case, the second user who is a correspondent can also requests the off record mode setting, the off record mode request by the second user is inputted into the information production unit 175 of the first headset 160C through the radio communication, and the off record tags are attached to the speech data. The attaching of the off record tags should preferably be carried out in correspondence to the device ID of the user who made the off record mode setting. Such a off record mode setting can be made by the intention of the speech uttering person and the consent of the correspondent is basically unnecessary.

Also, in the example of FIG. 14, the off record setting unit is provided in a form of the off record switch 172 provided on the headset, but it is also possible to command the off record mode by the speech command. In this case, the headset 160C also has the speech recognition unit (FIG. 8) shown in the third embodiment, and commands such as "off record", "off record from here", "off record cancel" are registered in advance as the standard commands. After a transition to the speech recognition mode is made as the wearer of the headset uttered the specific keyword for making a transition to the speech recognition mode, when the wearer utters the off record command described above, the off record command is recognized and the corresponding processing (off record start, off record cancel) is executed. In this case, the off record setting should preferably be made in correspondence to the voiceprint of the user or the device ID of the headset of the user who issued the off record command.

By providing the speech recognition unit to the system of FIG. 14, the speech recognition processing is to be carried out by the headset, but as shown in FIG. 8, it is also possible to carry out the speech recognition by the stationary type BT device. In either case, the uttered speech is recognized, and the processing for setting or cancelling the off record mode is executed according to the recognition result.

In the headset with the radio communication function and the communication recording system using that headset according to the fifth embodiment, when the information to be concealed arises unexpectedly during the conversation, it is possible to set the off record mode according to the intention of the wearer of the headset. In this way, the privacy of the conversations can be protected, and the reliability of the headset and the reliability of the entire communication recording system can be improved. Also, the off record mode can be set by the intention of the user so that it is highly convenient.

(Sixth Embodiment)

Figure 15:
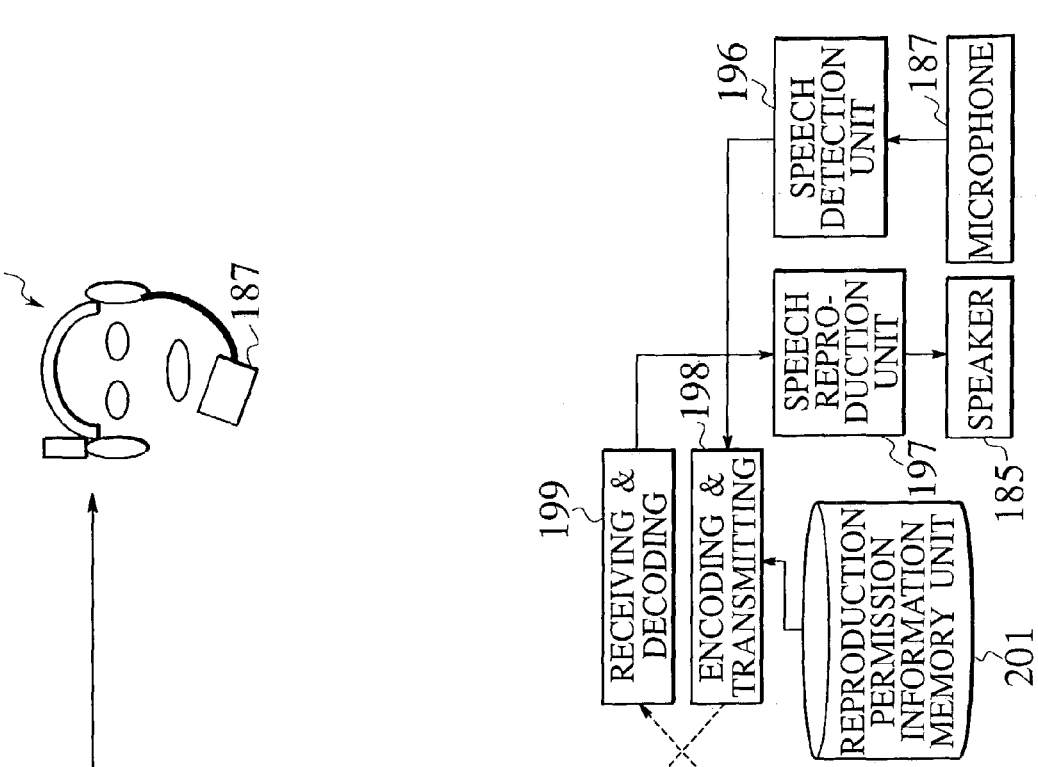
FIG. 15 is a block diagram showing a configuration of a communication recording system using a headset with a radio communication function according to the sixth embodiment of the present invention.

FIG. 15 shows the headset with the radio communication function and the communication recording system using this headset according to the sixth embodiment of the present invention.

The sixth embodiment is directed to the case where the constant recording of the headset is presupposed but it is also capable of handling the situation in which the reproduction of the recorded contents is to be suppressed.

As shown in FIG. 15, the headset 180A with the radio communication function has a reproduction judgement function in addition to the basic configuration shown in FIG. 2 in relation to the first embodiment. Namely, a reproduction permission information memory unit 201 stores in advance conditions under which the reproduction of the speech data stored in the memory unit 191 is permitted. A reproduction judgement unit 203 judges whether the speech data should be reproduced or not by referring to the reproduction permission information memory unit 201, when there is a reproduction request. When the reproduction is permitted as a result of the judgement, the speech data stored in the memory unit 191 are supplied to the speech reproduction unit 197. As described in the first embodiment, when the speech data are encrypted, the speech data are supplied to the speech reproduction unit 197 after the decryption by a decryption unit (not shown).

Figure 17A:
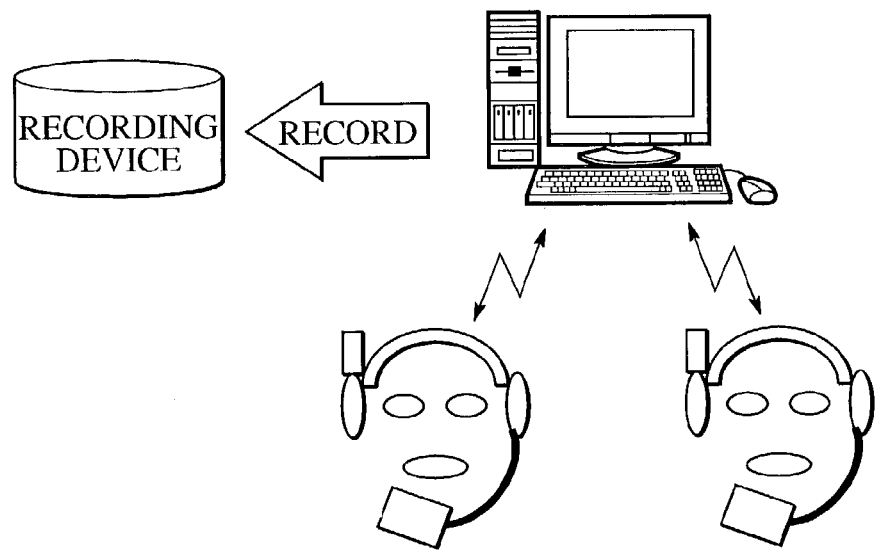
FIGS. 17A and 17B are diagrams showing ways of recording and reproduction that can be used in the communication recording system of FIG. 15.
Figure 17B:
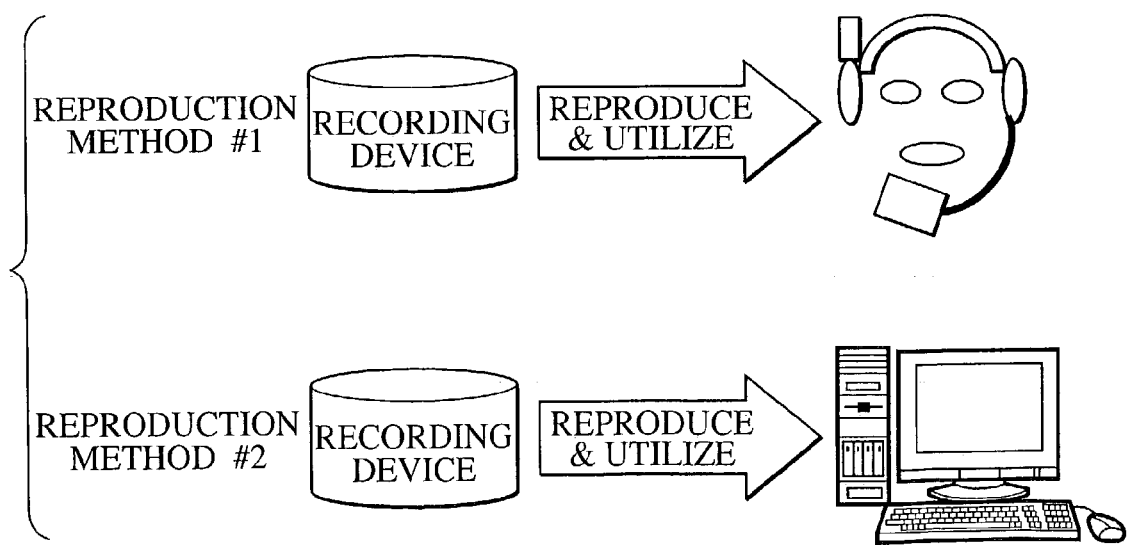

FIG. 16 shows examples of the reproduction permission information, and FIGS. 17A and 17B show ways by which the recording and the reproduction are to be carried out. In FIG. 16, a reproduction permitted place, a permitted contents, a reproducing person, etc., are set as the reproduction permission conditions. For example, in a part (a) of FIG. 16, no limitation is applied to any of these conditions. The reproduction judgement unit 203 permits the reproduction only when these conditions are satisfied. As a way of the reproduction, the contents recorded by the headset can be reproduced by the same headset (reproduction method #1 of FIG. 17B), or the contents recorded by the headset can be reproduced by a device such as PC in the case of using a detachable memory card (reproduction method #2 of FIG. 17B). There is also a way by which the recording is made in advance by the PC and the reproduction is carried out by the PC (reproduction method #2).

Note that FIG. 17A shows an exemplary way of recording in which the conversation contents are recorded by a device in a system using two headsets and one external device as described in the second embodiment, but it is also possible to carry out the recording by either one of the two headsets, and it is also possible to use a system formed by one headset and one device with the speech input function where the recording is carried out by the device.

Figure 18B:
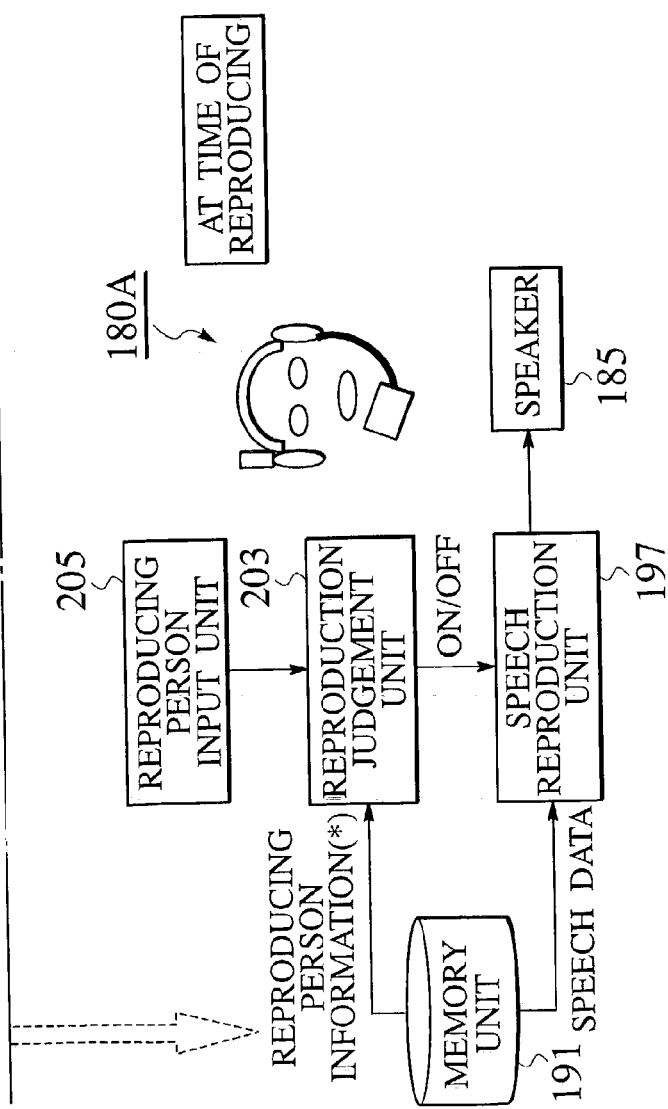

FIGS. 18A and 18B show the reproduction permission judgement in the case where the reproducing person is set as in parts (b) to (d) of FIG. 16. The reproduction permission condition memory unit 201 stores the reproducing person ID specified as the permission condition. The information production unit 195 relates the speech data with the reproducing person information which is the reproduction permission condition, and stores them in the memory unit 191.

When there is a reproduction request, the reproduction judgement unit 203 verifies whether the person who requested the reproduction is identical to the permitted reproducing person. When the reproducing person is specified as "a doctor of the hospital A" as in a part (b) of FIG. 16, the input of the doctor ID used in the hospital A can be urged from the reproducing person input unit 205. When an individual such as "doctor B" or "correspondent" is specified as in parts (c) and (d) of FIG. 16, the individual authentication can be carried out by using a password or a living body information (voiceprint, face, retina, etc.), for example.

When it is judged as the same individual as a result of the judgement, the speech data are supplied from the memory unit 191 to the speech reproduction unit 197, and outputted from the speaker 185.

When the reproduction permitted place is specified as in a part (e) of FIG. 16, the position can be identified by the connection with the fixed BT device provided in advance, for example. Also, the reproduction permission judgement can be made by using the positioning function of the Bluetooth when the headset is according to the Bluetooth specification, or otherwise, by using a position specifying function (see FIG. 4) provided in the headset.

Figure 19A:
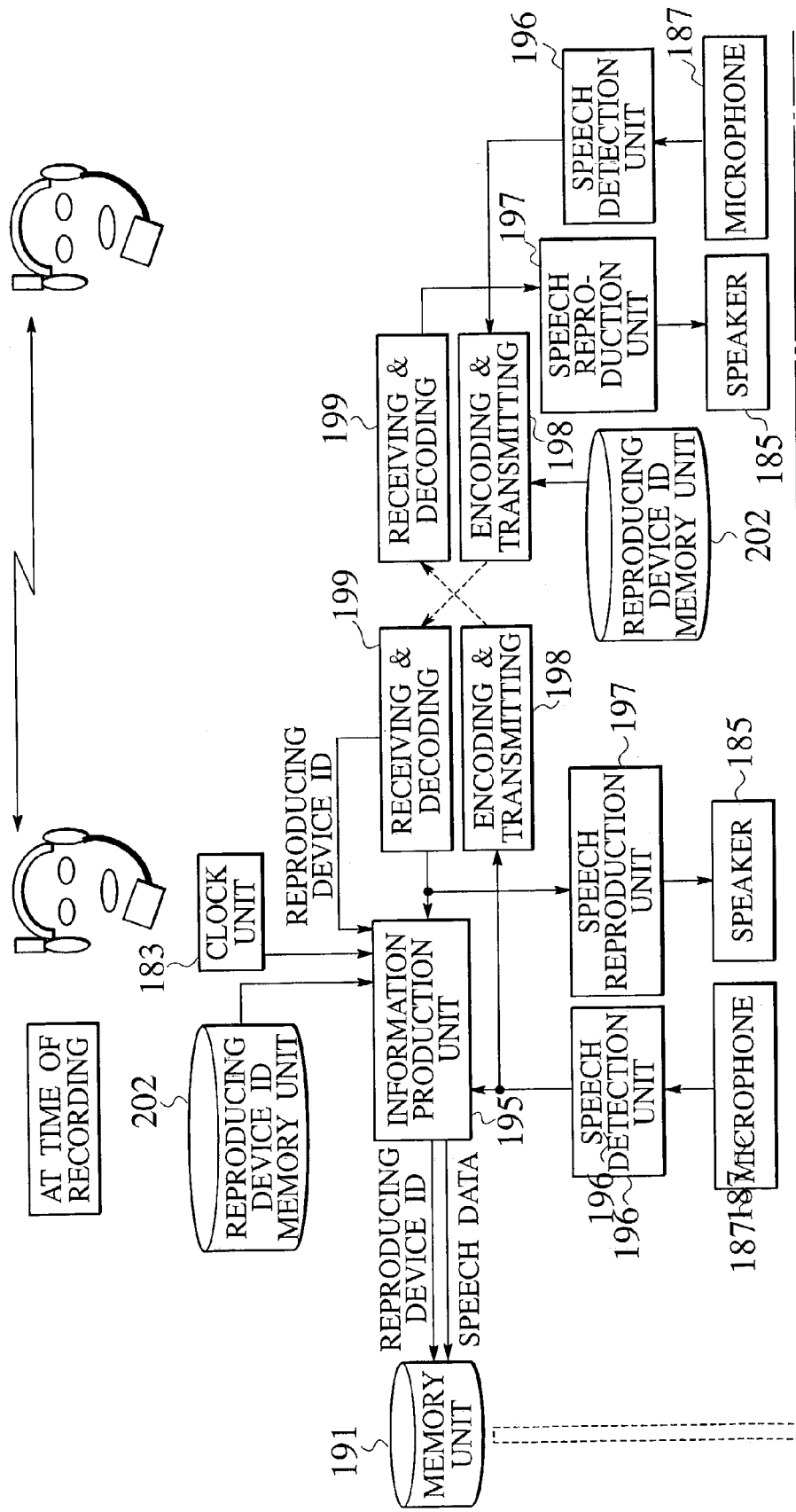
FIGS. 19A and 19B are a block diagram in two parts showing an exemplary case in which a reproduction is permitted according to a type of a device for reproducing, in the communication recording system of FIG. 15.
Figure 19B:
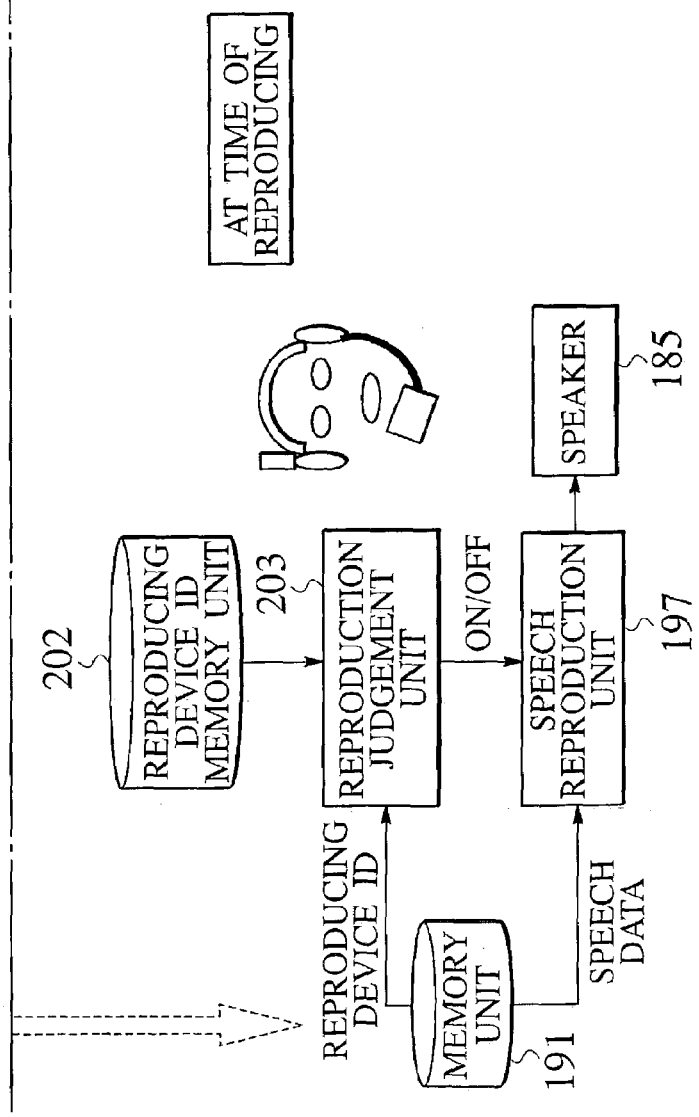

FIGS. 19A and 19B show the reproduction permission judgement in the case where the use of a specific device for the reproduction is set as the condition, in relation to the specified reproduction permitted place. The reproduction permission information memory unit 201 stores the reproduction device ID specified as the permission condition. The information production unit 195 relates the speech data with the reproduction device information which is the reproduction permission condition, and stores them in the memory unit 191. The reproduction judgement unit 203 judges whether the reproduction permitted device information related to the speech data stored in the memory unit 191 and the device ID to be used for the reproduction are identical or not. When they are identical, the speech data stored in the memory unit 191 are supplied to the speech reproduction unit 197 and outputted from the speaker 185.

FIGS. 20A and 20B show the reproduction permission judgement in the case where the conversation contents such as "medical examination contents" are set as the reproduction permission condition as in a part (f) of FIG. 16. The information production unit 195 produces information in which the keyword information is set in correspondence to the speech data, by referring to the keywords stored in the reproduction permission information memory unit 201. The memory unit 191 stores the speech data along with the specified keyword information.

Figure 22B:
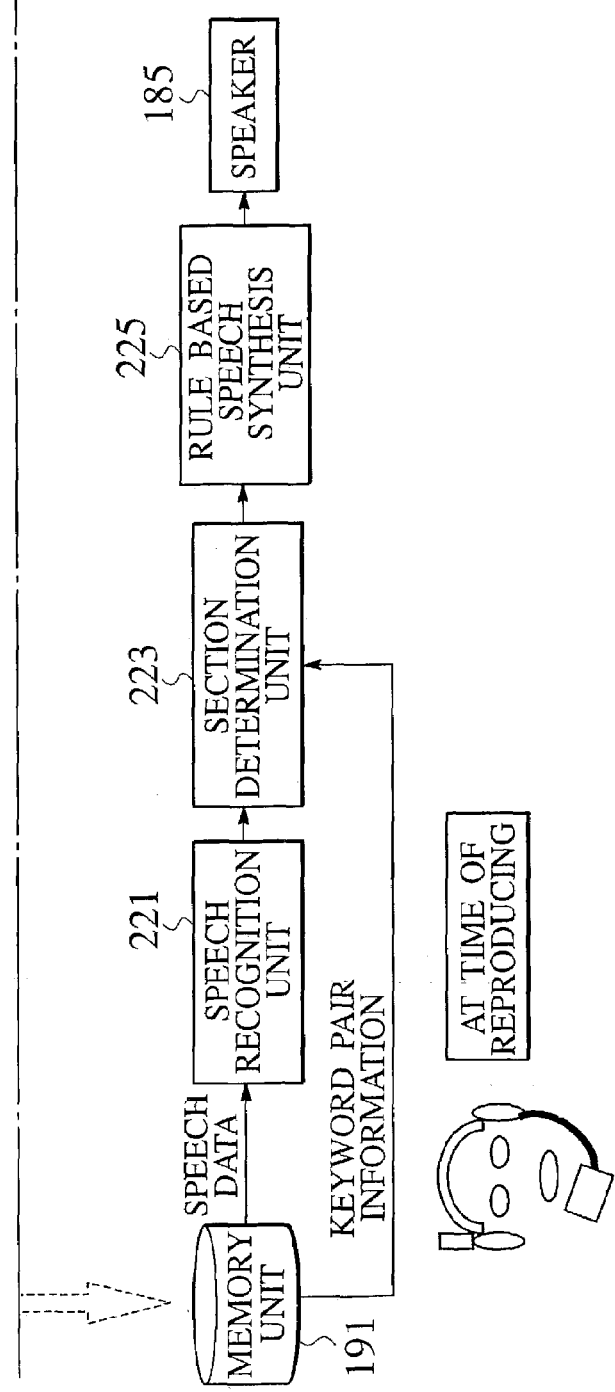

When the recorded content is set as the reproduction permission condition, as shown in FIGS. 22A and 22B, the speech recognition unit 221 carries out the speech recognition processing with respect to the speech data stored in the memory unit 191, and as described in the third embodiment, the keywords are extracted. In this case, the reproduction judgement unit 203 permits the reproduction of the speech in a prescribed section containing the keyword, when the extracted keyword matches the specified reproduction permitted content condition.

For example, when the keyword "changing clothes" for the case of the house nursing is set as the reproduction permission condition, in order to check the state under which the changing clothes was actually made, if the search using the "changing clothes" as a keyword is carried out, a section determination unit 223 identifies a phrase "we are going to change Mr. Yamada's clothes now" as a prescribed section containing this keyword, and a rule based speech synthesis unit 225 reproduce the speech of the identified section and outputs it from the speaker 185.

At a time of the recording, when the speech uttered user intentionally inputted the keyword for identifying the content such as "diagnosis explanation starts from here" or "diagnosis explanation ends at this point", for example, the extraction of the keyword becomes easier and only the speech in the section corresponding to the specified permitted content can be reproduced correctly. Depending on the speech uttered users, the more effective utilization becomes possible by the intentional input of the keyword if that can be helpful to carry out the correct reproduction later on.

Figure 21A:
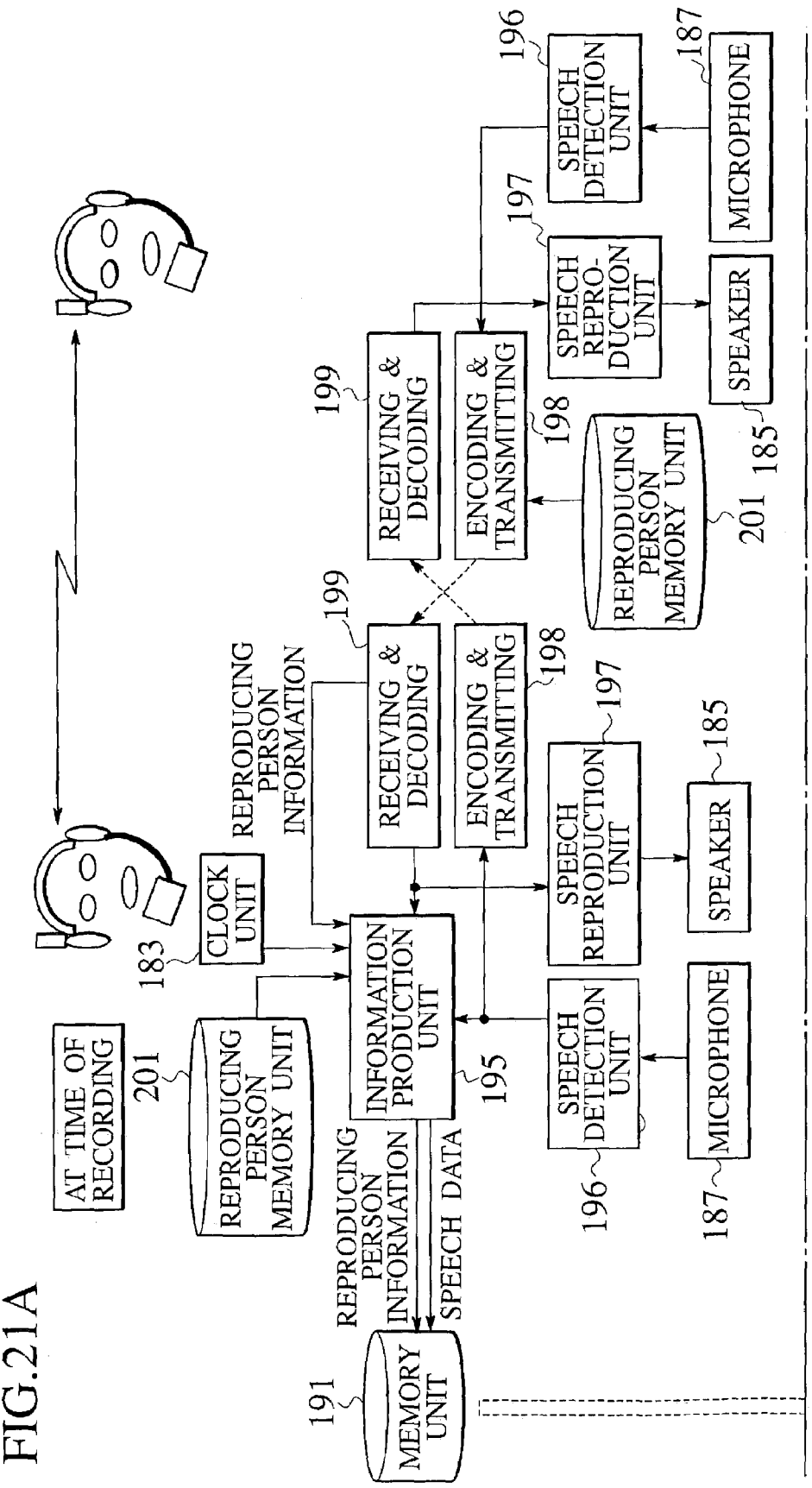
FIGS. 21A and 21B are a block diagram in two parts showing an exemplary case in which synthesized speeches are used when a reproduction is permitted, in a modified configuration of a communication recording system according to the sixth embodiment of the present invention.
Figure 21B:
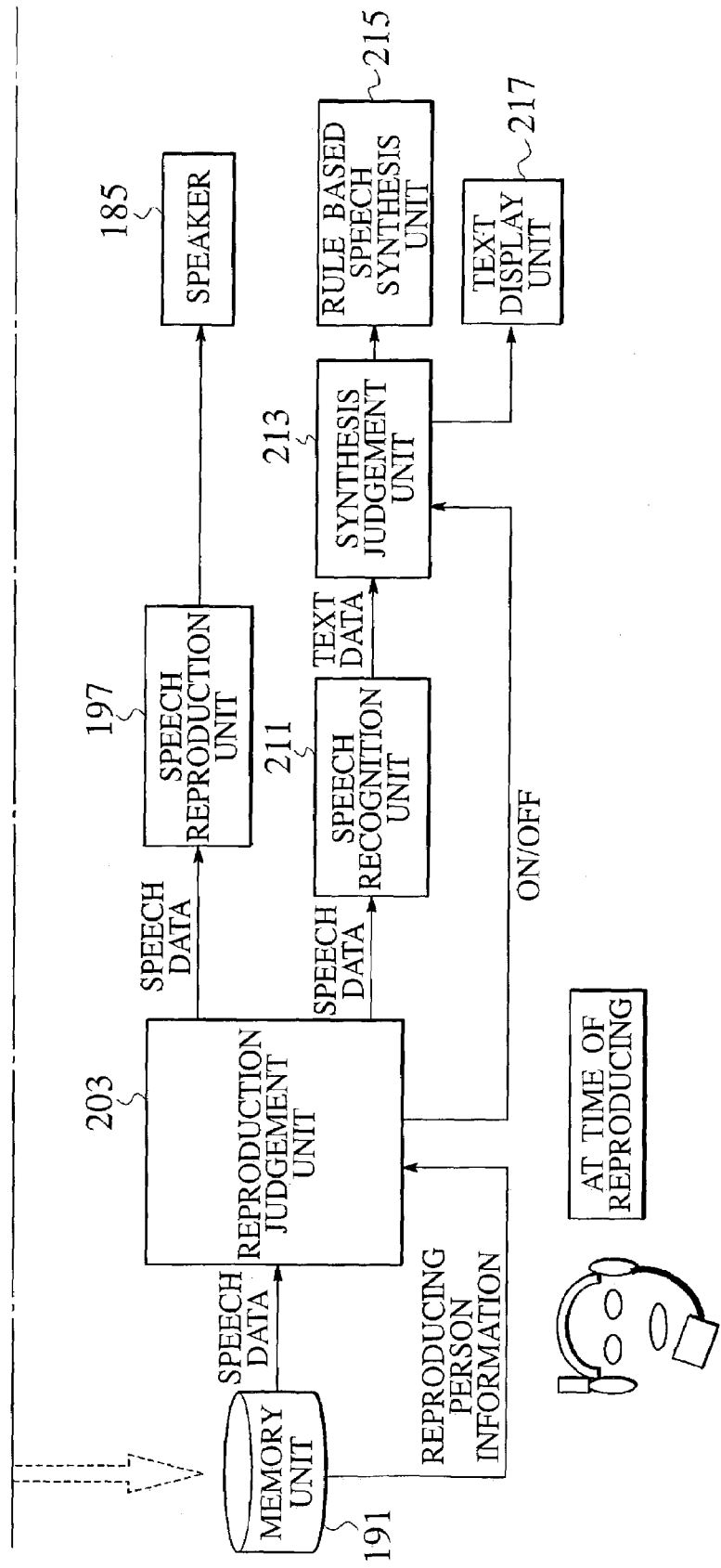

FIGS. 21A and 21B show another exemplary reproduction limitation, in which the recorded contents are reproduced by synthesized speeches.

The amount of information that can be conveyed can be largely different for the raw speech as recorded and the speech artificially synthesized from the text. For example, the speech of the superior and the speech of the colleague have different psychological effects on the listener's side even if they are linguistically identical. In the case of carrying out the reproduction, it is preferable to provide a mechanism for synthesizing and outputting the speech when the specified reproduction condition is satisfied at the reproduction judgement unit 203, in addition to the method for sending the speech to the speech reproduction unit 197 to reproduce the speech and outputting it from the speaker 185 as described so far.

In this case, the speech data that are the target of the reproduction request are converted into the text by recognizing them at a speech recognition unit 211, to extract only the linguistic information. Next, this text is supplied to a synthesis judgement unit 213 and a rule based speech synthesis unit 215, and converted again into a different speech by the rule based speech synthesis. The synthesized speech is outputted from the speaker 185. In this configuration, it is possible to output the speech from which the emotion, the individuality, etc. contained in the raw speech are eliminated. For example, in the case where the emotional speech was made in a conference or the like and the judgement is to be made by listening to it later on, if it is considered that a cool judgement cannot be made by listening to the raw speech, this mechanism can be utilized. Also, conversely, there can be cases where it is preferable to listen to the raw speech as recorded, in order to realistically reproduce the individuality or the situation on the spot.

This configuration using the rule based speech synthesis function can be utilized in combination with the reproduction permission information described above. For example, when the speech content is specified as the reproduction permission information, the text of a section containing the keyword extracted by the word spotting can be sent to the rule based speech synthesis unit 225 to produce and output the synthesized speech, as shown in FIGS. 22A and 22B. Note that the judgement as to which one of the synthesized speech and the raw speech should be used for the reproduction is carried out inside the reproduction judgement unit, but it is also possible to make this judgement according to a command by the speech uttered user at a time of the recording, or a command by the reproducing and listening side.

However, when the speech uttered user attached information such as a specified speech section can be reproduced only by the raw speech among the recorded speeches, even if the listening side requested to listen the synthesized speech, it is possible to reject this request and carry out the control to reproduce it by the raw speech forcefully. In any case, the point is to have a mechanism by which either the synthesized speech or the raw speech can be listened, and it can be utilized by adopting various operating policies.

Also, the recorded information contains recorded speeches of a plurality of speech uttered users such as a caretaker and a cared person, for example, so that it is possible to adopt a scheme in which the reproduction is limited to the case where both sides consented. On the other hand, in the case of the doctor and the patient, for example, it is possible to adopt a scheme in which those authorized by the law such as a doctor, an attorney, an administrative official, etc., can reproduce it without any consent.

Figure 23A:
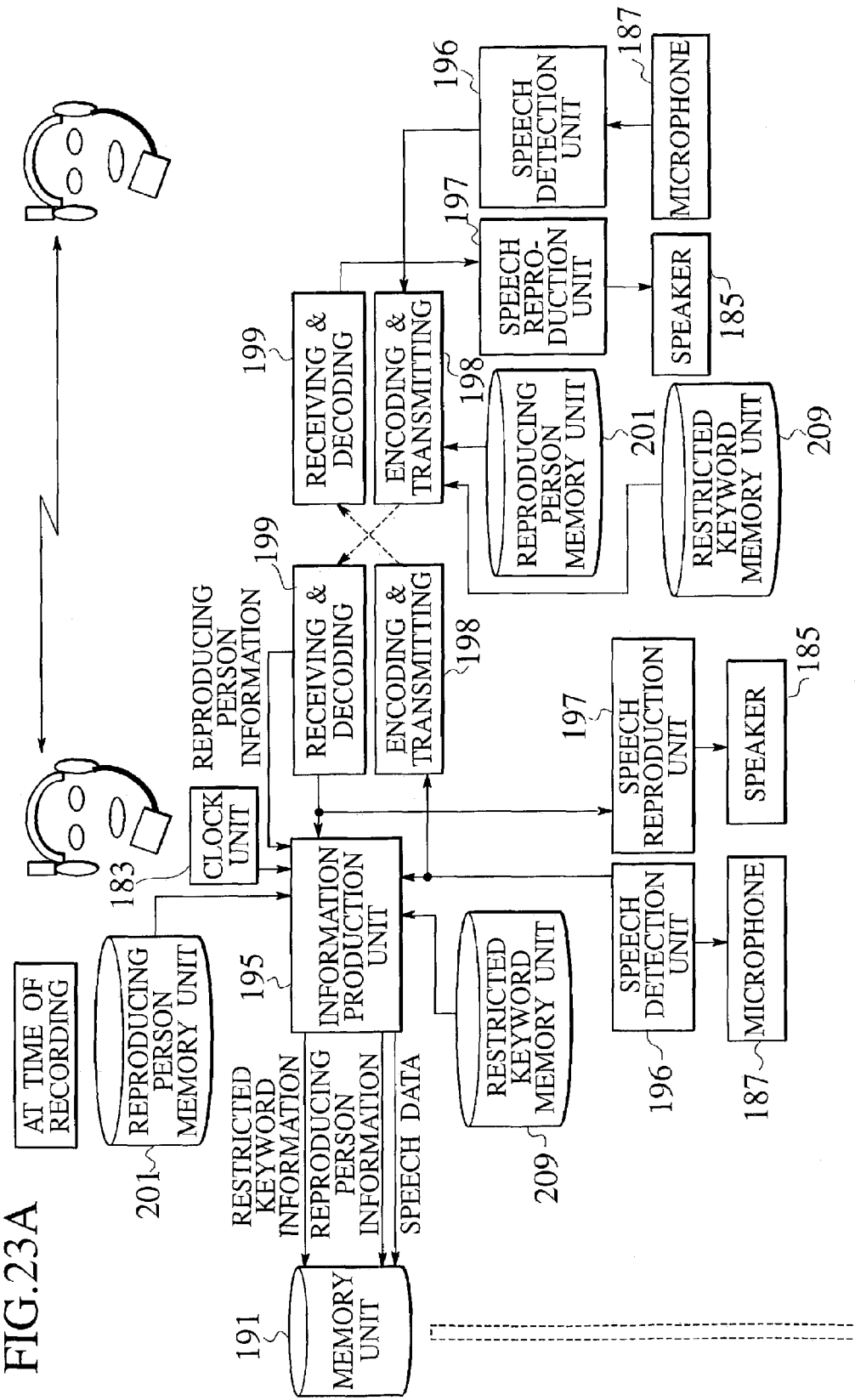
FIGS. 23A and 23B are a block diagram in two parts showing an exemplary case in which a reproduction of a part containing a prescribed keyword is suppressed, in a modified configuration of a communication recording system according to the sixth embodiment of the present invention.
Figure 23B:
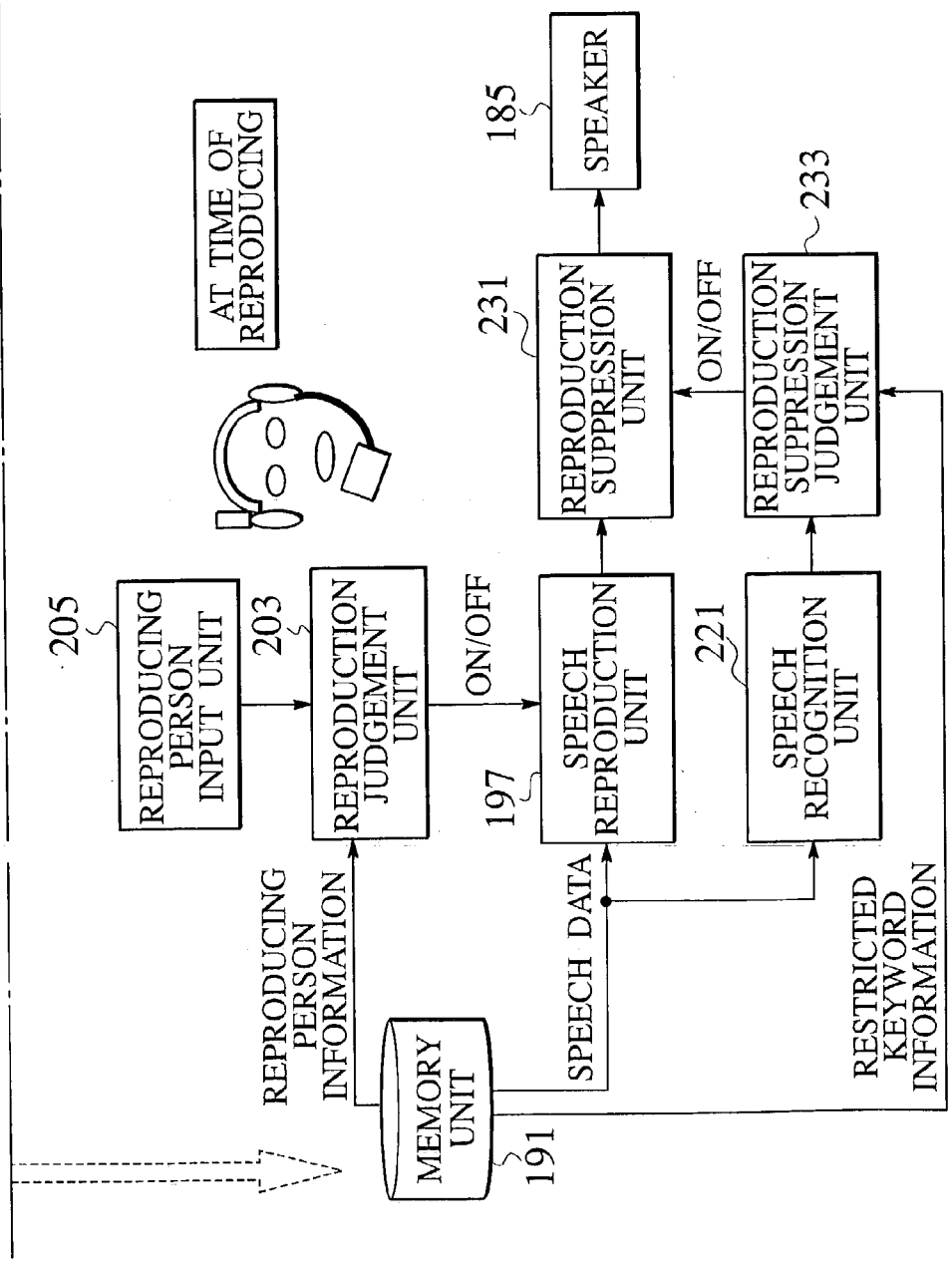

FIGS. 23A and 23B show another exemplary case of the reproduction limitation, in which the reproduction of a certain portion is prohibited rather than the reproduction is permitted under a certain condition. In this exemplary configuration, the headset has a speech recognition unit 221*m* a reproduction suppression judgement unit 233, and a reproduction suppression unit 231, in addition to the reproduction judgement unit 203. The reproducing person, place, reproduction contents, etc. that are listed as the reproduction permission conditions in FIG. 16 can be used as the reproduction prohibition conditions in the case of FIGS. 23A and 23B.

The example of FIGS. 23A and 23B shows the case where the reproducing person is specified as the reproduction prohibition condition, and the case where the reproduction is prohibited for a certain keyword. In the case where the reproducing person is prohibited, the information production unit 195 produces the information to be stored by setting the prohibited reproducing person information in correspondence to the speech data. In the case where the reproduction is prohibited for a certain keyword, the information to be stored is produced by setting a restricted keyword information to the speech data.

When the reproducing person is prohibited, the reproduction judgement unit 203 judges whether the prohibited reproducing person contained in the speech data stored in the memory unit 191 and the person who is trying to reproduce are identical or not. If they are identical, the reproduction of this speech data will be suppressed by the reproduction suppression unit 231. Namely, even if the person for which the reproduction is prohibited makes the reproduction request, the speech will not be reproduced.

As for the prescribed keyword, first, the speech stored in the memory unit 191 is recognized by the speech recognition unit 221, and whether the recognized content contains the restricted keyword or not is judged by the reproduction suppression judgement unit 233. When the restricted keyword is contained, the reproduction is suppressed by the reproduction suppression unit 231. More specifically, the reproduction is controlled such that a relevant portion becomes inaudible by substituting the blocking sound into the reproduced sound or by skipping the restricted keyword itself. Similarly, when the reproduction prohibited place is set, the reproduction is controlled such that the speech portion corresponding to the prohibited place will not be reproduced when the condition is satisfied.

Also, as described in the fifth embodiment, when the off record tags are attached to a prescribed section, the reproduction judgement unit 203 detects the off record tags, and suppress the reproduction for the section specified by the tags. The reproduction judgement unit 203 refers to the speech uttered user information (user information) that is recorded as linked to the speech by the information production unit 195. When it is judged that the permission by the person who set the off record mode is necessary, there is a possibility for causing a privacy problem or a serious problem due to a disclosure of secret matters to the third person, so that the authentication is carried out by an authentication unit (not shown). Namely, in order to match the person who is trying to reproduce the off record section (the headset wearer) and the person recorded as one who set the off record mode, the input of the password is urged to the reproduction requesting person, for example, or the speech is urged to carry out the authentication using the speech information. When the reproduction of the off record section is not permitted, the section specified by the off record tags is processed such that a white noise sound or a beep sound is outputted for this section or this section is skipped in the output.

Also, although not shown in the figure, it is possible to provide the authentication unit in the headset and set a function for authenticating a supervisor who can reproduce the off record portion without a permission from the relevant person when it is judged that the recorded contents are requested as an evidence for the lawsuit or the like. The supervisor is a socially acknowledged person who is capable of making the proper judgement as a third person such as a judge.

In the headset with the radio communication function and the communication recording system using this headset according to the sixth embodiment, the reproduction of the conversation contents for which the reproduction is undesirable is suppressed, so that the privacy of the conversation contents can be protected.

(Seventh Embodiment)

Figure 24:
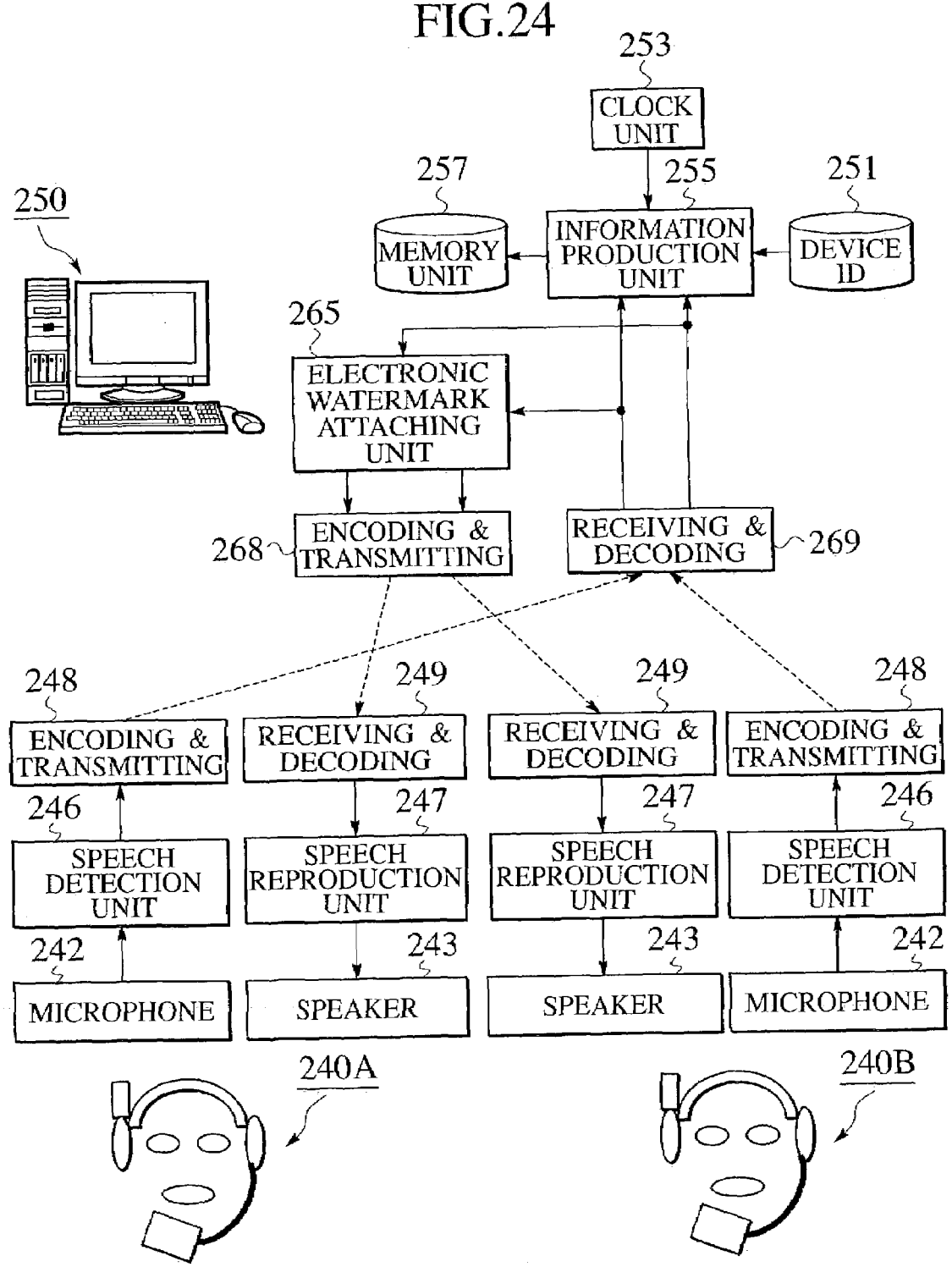
FIG. 24 is a block diagram showing a configuration of a communication recording system using a headset with a radio communication function according to the seventh embodiment of the present invention.
Figure 25:
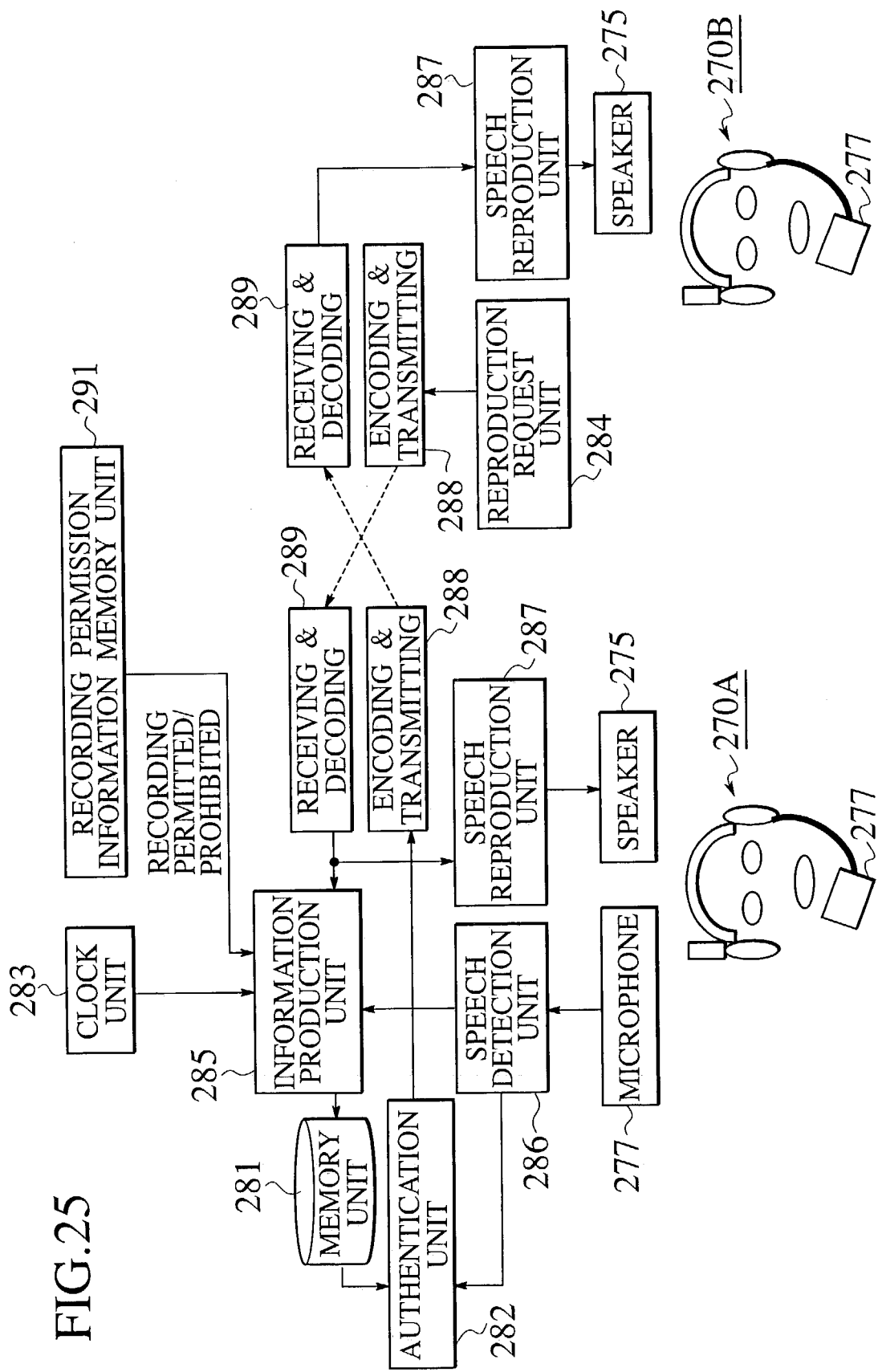
FIG. 25 is a block diagram showing a modified configuration of a communication recording system using a headset with a radio communication function according to the seventh embodiment of the present invention.

FIG. 24 and FIG. 25 show the communication recording system according to the seventh embodiment of the present invention. The seventh embodiment provides a configuration capable of improving the security of the headset itself and the entire communication recording system. An example of FIG. 24 shows a configuration for attaching an electronic watermark to the speech signal transmitted/received between the headsets, and FIG. 25 shows a configuration for authenticating a wearer of the headset as a legitimate user.

In the communication recording system of FIG. 24, the electronic watermark is used as a measure against the case of the illegal utilization in which the speech reproduced and outputted from the speaker is recorded by another device. The headsets 240A and 240B carry out conversations through a device 250. For example, the first speech signal generated by the microphone 242 of the headset 240A is transmitted by radio to the device 250 from the encoding and transmitting unit 248 first. At the device 250, the received first speech signal is supplied to an information production unit 255 as well as to an electronic watermark attaching unit 265. The electronic watermark attaching unit 265 attaches the electronic watermark to the first speech signal, and the first speech signal is transmitted by radio to the second headset 240B from an encoding and transmitting unit 268.

Similarly, at the second headset 240B, the second speech signal is generated from the speech uttered by the user in response to the content of the first speech signal received and outputted from the speaker 243, and the second speech signal is transmitted by radio to the device 250 from an encoding and transmitting unit 248.

The device 250 supplies the received second speech signal to the information production unit 255 as well as to the electronic watermark attaching unit 265 to attach the electronic watermark. The second speech signal with the electronic watermark attached thereto is transmitted to the first headset 240A through the radio communication.

The speech signal with the electronic watermark attached thereto can be recorded by another recording device after being outputted from the speaker, for example. However, when the reproduction of this speech is attempted, the electronic watermark will be detected without a failure. Consequently, even if the malicious headset user attempts to record it without a permission and misuse the contents, when the watermark is detected from the recorded speech, it can be judged as the speech information acquired through an illegal route. For example, when a malicious person attempts to misuse the recorded contents as the evidence in the lawsuit, whether it is the information acquired by the illegal operation or not can be determined by requiring the submission of the original recorded speech and checking the presence/absence of the watermark.

Note that, in the example of FIG. 24, the system is formed by two headsets 240A and 240B and the BT device 250, but it is obviously also possible to apply the electronic watermark to the case of forming the system by one headset and one BT device with the speech input function as shown in FIG. 8.

The headset 270A with the radio communication function of FIG. 25 has an authentication unit 293 for authenticating that the wearer of the headset is a legitimate user. In the case of the communications between the headsets, there is a need to prove to the correspondence (device) that it is the information transmitted by the legitimate user of the headset. The speeches are ordinarily used and they do not exert any burden on the user, so that the authentication system based on the speaking user authentication has been known for long time. However, the conventional speaking user authentication system has problems such as (1) there is a need to register the speaking user in advance, (2) there is a need to update the registered speech frequently because the voice quality of the speaking user has a tendency to change in time, or otherwise there is a need to make the authentication not so strict by dropping the matching precision, and there is a need to set up or wear a microphone at each occasion of the registration.

In order to cope with these problems, in the headset 270A with the radio communication function of FIG. 25, the memory unit 281 stores the speech signal generated by the microphone 277 of the headset 270A in addition to the conversation contents to be stored, and updates the stored speech signal every time. The authentication unit 293 compares the speech signal currently generated by the microphone 277 with the latest updated speech signal in the memory unit 281, and judges whether the currently picked up speech coincides with the speech of the speaking user that was collected continuously over a prescribed period of time in the past or not. When they coincide, the authentication result is outputted to the encoding and transmitting unit 288 along with the device ID of the headset 270A. The encoding and transmitting unit 288 transmits the speech signal by radio from the headset 270A to the second headset 270B, along with the authentication result. The second headset 270B can check that it is transmitted from the legitimate user of the headset 270A by referring to the authentication result.

In such a configuration, even when a third person illegally uses the headset 270A, for example, this third person will not be judged as a legitimate user unless the speech input over the prescribed period of time is made. In this case, the first speech is transmitted to the second headset 270B in a non-authenticated state. By judging the presence/absence of the authentication at a receiving unit of the second headset 270B, whether the headset 270A is illegally used or not can be ascertained.

Also, even when the legitimate user of the headset 270A has the voice tone changed due to the flu or the like, the recorded voice features are updated every time the user utters the speech, so that the user is correctly judged as long as the speech input into the microphone 277 is made for the prescribed period of time.

The headset 270 basically presupposes the constant communication and the constant recording, so that it is constantly worn on the head of the user and a very little burden is exerted on the user due to the authentication. By providing such an authentication function, the security of the headset itself and the entire communication recording system using the headset can be Improved considerably.

(Eighth Embodiment)

Figure 26:
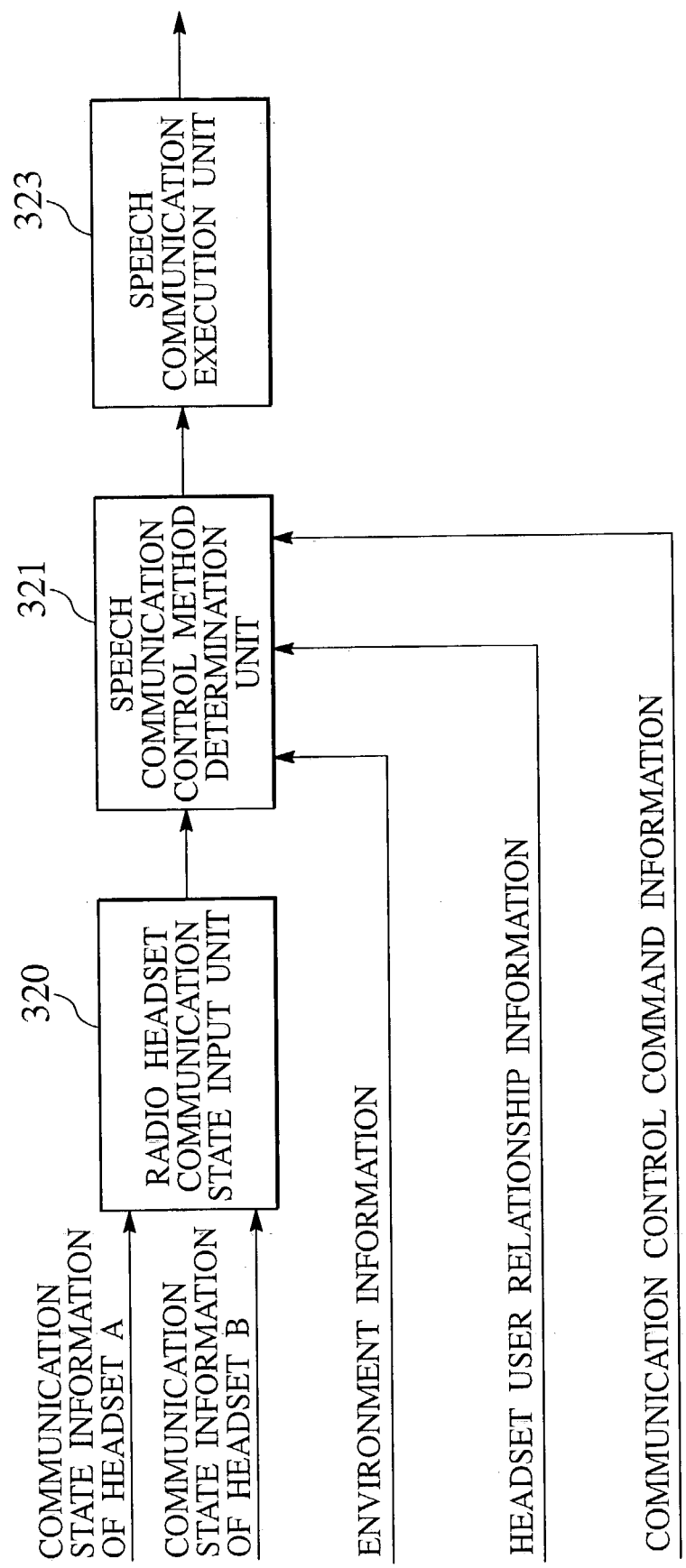
FIG. 26 is a schematic diagram showing an outline of a speech communication control method according to the eighth embodiment of the present invention.
Figure 27:
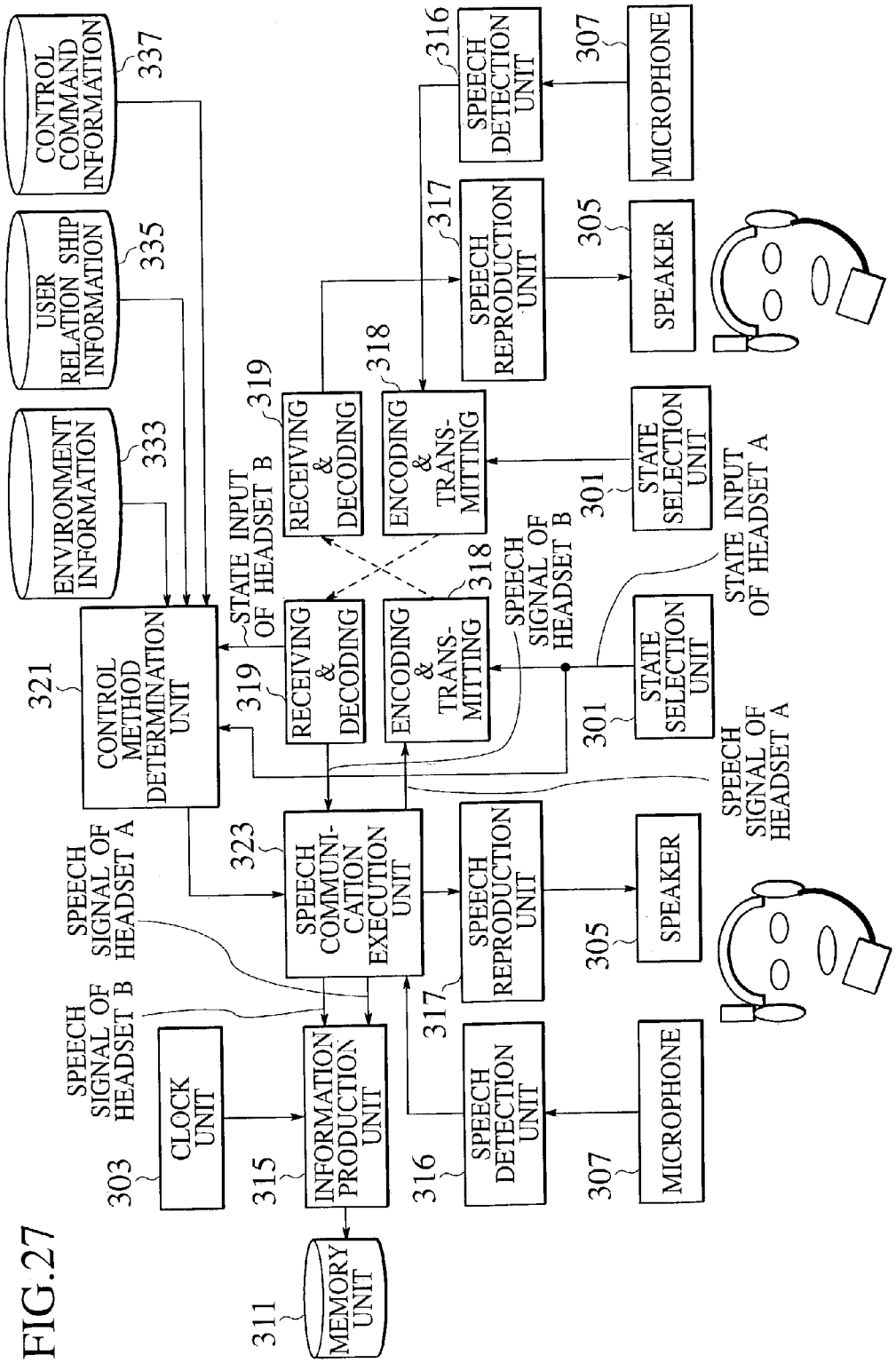
FIG. 27 is a block diagram showing a configuration of a headset system using a speech communication control method according to the eighth embodiment of the present invention.

FIG. 26 shows a speech communication control method according to the eighth embodiment of the present invention, and FIG. 27 shows the headset with the radio communication function and the communication recording system to which this speech communication control method is applied.

The eighth embodiment provides a configuration for determining the speech communication control method according to a combination of states of the transmitting side and the receiving side, by accounting for the psychological state of the transmitting side such as "want to be heard", "may be heard", and "don't want to be heard", and the psychological state of the receiving side such as "want to hear", "may hear", and "don't want to hear".

Namely, a shown in FIG. 26, the state of the user such as "want to be heard" or "want to hear" is inputted into a speech communication control method determination unit 321 through a radio headset communication state input unit (selection unit) 320. To the speech communication control method determination unit 321, an environment information, a headset user relationship information, and a communication control command information are also inputted.

At the speech communication control method determination unit 321, the state selected by the user and the various informations are referred, and the control method for the communications to be carried out between the headsets is determined. The speech communication execution unit 323 executes the control of the presence/absence of the speech input/output, the control of the volume and the sound quality of the speech, the control of the recording and the reproduction, etc., according to the determined control method.

Among the above described informations, the environment information is information regarding an unintentional environment (state) of the user such as a place of the action of the user wearing the headset, a time, an activity state, a temperature, a working state, busyness, etc. For example, in the case where the headset users are a doctor and a patient, if they are inside the hospital upon referring to the environment information, the recording and the reproduction of the speech information are permitted. Also, in the case of members of some project of an organization, it is determined that the recording and the reproduction are possible only when the project members are present together or the recording and the reproduction are possible if they are inside the building of their affiliated enterprise or organization. By accounting for such an environment information, the reinforcement of the memory function of the human being and the reinforcement of the privacy and security functions can be achieved simultaneously.

The headset user relationship information is human relationship information such as a doctor and a patient, a doctor and a nurse, a teacher and a student, a superior and a subordinate of an organization, a policeman and a suspect, a salesman and a customer, a parent and a child, etc., for example. This information is utilized in order to appropriately control the privacy and the security according to the human relationship. By accounting for the human and social cultural aspects in this way, it becomes possible for the IT technology to deal with new values, safety, security, the product liability problem, etc.

The communication control command information is command information regarding the specific communications, records, etc. For example, it is acquired when it becomes a specific time, by monitoring the heart of the patient by the radio communication, checking values of the instruments, and acquiring these values.

When these informations are used, in the case where the headset users are a doctor and a patient, it becomes possible to give the advise-of the doctor or the command for the medication according to the time and the monitored information. In this way, by using at least one of the environment information, the headset user relationship information and the communication control command information either independently or in combination with the communication states of the headsets, it becomes possible to realize the more sophisticated communication control.

FIG. 27 shows a configuration of the headset system using the headsets 300A and 300B with the radio communication function to which the communication control method of FIG. 26 is applied.

This headset system contains the first headset 300A with the radio communication function and the second headset 300B capable of carrying out the radio communications with the first headset. Each one of the first and second headsets has a microphone 307 for detecting the speech of the wearer and generating the first speech signal, transmitting and receiving units 318 and 319 for transmitting the first speech signal to the other headset and receiving the second speech signal transmitted from the other headset, and a state selection unit 301 by which a desired communication state is selected by the wearer.

The speech signal detected by the microphone 307 of the first headset 300A is inputted into a speech communication execution unit 323. The speech signal transmitted by the second headset 300B is also inputted into the speech communication execution unit 323. On the other hand, the user of the first headset 300A inputs his own current desired communication state through the state selection (input) unit 301. This first state is inputted into the control method determination unit 321. The user of the second headset 300B similarly selects the state, and this second state is inputted into the control method determination unit 321 through the radio communication. The control method determination unit 321 determines the speech communication control method according to these inputted states.

To the control method determination unit 321, the environment information, the user relationship information, and the control command information are inputted as described above, and the control method is determined by accounting for a part of a whole of them according to the need.

The speech communication execution unit 323 outputs the speech to the speech reproduction unit 317 after converting it to the prescribed volume and sound quality in the case of the reproduction, for example, according to the determined control method. In the case of the recording, it is outputted to the information production unit 315.

FIG. 28 shows an exemplary speech communication state table that stores various states. The feature of the headset with the short range radio communication function provided by the present invention is such that it enables not only the speech communication like the telephone without using any cords but also the communications using the speeches and the audio signals as well as the various conversations (interactions) utilizing the speeches between the human being and an information device or between human beings, any time, anywhere, with any correspondent, while carrying out actions. It is truly the ideal ubiquitous and wearable device, which is the information device closest to the human being. The new values can be created by merging the speech recognition and comprehension, speech synthesis, and speech dialogue techniques as described in the above embodiments into such a headset.

However, as a sacrifice to its conveniency, the amount of information that has been kept increasing by the full-scale spread of the Internet, the intranet, the digital broadcasting, the database and the e-mails are even flooded so that the problem of the information deluge becomes more serious.

For this reason, the function that accounts for the situation at a time of acquiring the information such as "want to hear (want to know)", "may hear (may know)", and "don't want to hear (don't want to know)", or the emotional and cognitional aspect of the human being such as "want to be heard (want to be known)", "may be heard (may be known)", and "don't want to be heard (don't want to be known)" is introduced into the short range radio communication headset system. In particular, the audio information and the spoken language information have properties different from the other sensorial information such as those of text, visual sense, and tactual sense, and they play important roles in the short range radio communication headset system.

Each one of the headsets 300A and 300B stores the states at a time of the transmission including "want to be heard", "may be heard", and "don't want to be heard" along with the identifiers t1, t2 and t3, respectively. In addition, the states at a time of the reception including "want to hear", "may hear", and "don't want to hear" are also stored along with the identifiers r1, r2 and r3, respectively. The control method determination unit determines the actual operation such as the reinforcement of the privacy protection, the forceful (PUSH) transmission of the speech message, etc., by referring to the state selected by the user out of these states, and also referring to the environment information, etc., if necessary.

FIGS. 29A and 29B show details of such state tables. For example, suppose that the state of the headset A is "want to hear" and "don't want to be heard", and the state of the headset B is "may hear" and "may be heard". In this case, from FIG. 29A, the speech of the headset B will be outputted from the speech communication execution unit but the speech of the headset A will not be outputted.

Note that, although not shown in the figure, it is also possible to store the states such as "want to be recorded", "don't want to be recorded", "may record", "don't want to be reproduced", etc. By selecting such a state, in the case where one does not want to hear the correspondent's speech, even under the circumstance where it is difficult to say "I don't want to hear" directly to the correspondent in the direct conversation, it is possible to set up a situation for not hearing it without being noticed by the correspondent, by simply selecting the state at the headset. Namely, when the headset with the radio communication function of the eighth embodiment is used, it becomes possible to realize the new speech communications which have effects different from those of the direct conversations between the human beings.

Each headset is provided in advance with the speech communication state information to be used at a time of the transmission or reception. For example, at a time of the usual (default) headset utilization, the state capable of carrying out the free communication and recording such as "want to be heard" and "want to hear" is set. In this state, the communication range of the human being is expanded and the memory function of the headset is reinforced. On the contrary, in the situations where the protection of the privacy and the security becomes important, the usual (default) state of the headset can be changed to states such as a state in which the speech listening level is low, a state in which the speech is inaudible, a state in which the speech is distorted, a state in which the recording and the reproduction are not permitted, etc.

As an exemplary application of such a headset system, in the case where an informationally weak such as an aged person is wearing the headset A, the state of "want to hear (want to know)" is set at the top priority at the receiving side. Also, regarding the reproduction condition, in the case of recording the speech regarding the medical examination or the diagnosis of the doctor who looks after this aged person as a patient, the reproduction by the aged person himself and his family member (guardian) is permitted. In this case, it is convenient if the family member also utilizes the headset. It is also possible to specify in advance the information desired to be heard by the aged person himself repeatedly by recording it and reproducing it as the control command information, and it is also possible to provide matters requiring attention in the daily life by reproducing them appropriately by specifying time, place, etc. It is also effective to provide text or video information at appropriate timing (control command) under the appropriate environmental condition, in addition to the speech information recorded for the headset. Moreover, it is easily possible to realize the control of the speech communications with respect to the family member of the aged patient from the doctor, such as that it may be heard by the family member or the guardian. It goes without saying that it is possible to appropriately utilize the security or the copyright protection scheme described in the above embodiments or the conventional communication control technique.

In the eighth embodiment, the exemplary case of carrying out the speech communications between two users has been described, but it is easily possible to realize the case involving three or more users by adjusting the speech communication state tables and the speech communication control method. By using such a headset system, it becomes possible to pursue and realize the ideal way of the speech communications between human beings. It will-be qualitatively innovating a new face-to-face communications where the faces are visible to each other.

As described above, according to the headset with the radio communication function and the system of the present invention, the intention or the purpose and the dialogue between the users of the headsets can be shared while maintaining the privacy. For example, in the case of the doctor or the teacher, the information related to the privacy of the patient or the student is contained in his conversations. Also, the state of the medical treatment in the medical ward or the operating room which is a closed space where the doctor has the control or the state of the educational conduct in the classroom where the teacher has the control over the students is recorded, so that the family members, parents, and guardian can share the information with confidence. In this way, it becomes possible to realize the effective coordination with the treatment at home or the education at home. For the doctor, nurse or teacher, the burden will be increased in a positive sense as the openness is increased, but the effects that can be obtained in return are considerable.

The information recorded by the communication recording system or the headset system according to the present invention has a high evidential value. For example, when the medical accident or the serious bully problem arises, it is possible to appropriately reproduce it to the third person or the evaluation and investigation committee as long as the permission of the director of the hospital or the school or the court is obtained or the agreement is reached among the relevant parties.

Also, the system of the present invention is fully equipped with the mechanisms for the privacy and the security so that there is a great advantage in that the users can carry out the off record conversations at ease. Unlike the acts conscious of the audience or the record such as the current virtual discussions by the mails or the bulletin boards on the Internet or the intranet, it is possible to retain the preferable features of the relaxed and transient speech conversations at the real life social spots such as actual conference room, restaurant, meeting place, car, airplane, smoking room, etc.

In other words, by the setting and controlling of the various types of the permissions such as the recording and the reproduction are possible if the consent of the correspondent is obtained, the reproduction is possible when the correspondent is present, the reproduction is possible when the correspondent permits, the reproduction is possible only at the same place as that of the recording, etc., it is possible to create new effects such as the assistance to the memory, the respect of the originality, the easy and comfortable conversations, etc.

According to the present invention, it is possible to improve the evidential value of the recorded contents while enabling the constant communication and the constant recording under the arbitrarily free circumstances.

It is also possible to surely protect the privacy of the conversation contents by setting various conditions on the recording and reproducing processing.

It is also possible to search, reproduce and utilize the recorded information easily and surely, while maintaining the secrecy.

It is also possible to effectively prevent the illegal use of the recorded data or the illegal act by the headset itself.

It is also possible to control the communication, recording and reproduction according to the state of the wearer of the headset, while accounting for the emotional aspect of the human being.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A headset with a radio communication function comprising:
    a microphone configured to detect a speech of a wearer and generate a first speech signal;
    a transmission and reception unit configured to transmit the first speech signal by a short range radio communication, and receiving a second speech signal returned in response to the first speech signal by the short range radio communication;
    a time information acquisition unit configured to acquire a time information indicating occurrence times of the first speech signal and the second speech signal;
    an information production unit configured to produce a recording information to be stored in which the time information is set in correspondence to the first speech signal and the second speech signal; and
    a memory unit configured to store the recording information produced by the information production unit,
    wherein the time information acquisition unit includes:
        a clock radio receiving unit configured to receive a reference radio signal on which information on a current time is conveyed; and
        a time extraction unit configured to extract the current time from the reference radio signal.

2. The headset with the radio communication function of claim 1, wherein the information production unit extracts keywords contained in the first speech signal and the second speech signal, and produces the recording information that contains the keywords.

3. The headset with the radio communication function of claim 1, furher comprising:
- an off record setting unit configured to set an off record command for prohibiting a recording of specific portions of the first speech signal and the second speech signal;
- wherein the information production unit produces the recording information in which a start time and an end time of the off record command are related to the first speech signal and the second speech signal.

4. The headset with the radio communication function of claim 1, further comprising:
- an authentication unit configured to authenticate the wearer as a legitimate wearer according to the first speech signal;
- wherein the transmission and reception unit transmits the first speech signal by attaching an authentication result when the authentication unit authenticated the wearer.

5. A headset with a radio communication function comprising:
- a microphone configured to detect a speech of a wearer and generate a first speech signal;
- a transmission and reception unit configured to transmit the first speech signal by a short range radio communication, and receiving a second speech signal returned in response to the first speech signal by the short range radio communication;
- a time information acquisition unit configured to acquire a time information indicating occurrence times of the first speech signal and the second speech signal;
- an information production unit configured to produce a recording information to be stored in which the time information is set in correspondence to the first speech signal and the second speech signal;
- a memory unit configured to store the recording information produced by the information production unit; and
- a position information acquisition unit configured to acquire a position information indicating a current position of the headset;
- wherein the information production unit produces the recording information in which the time information and the position information are set in correspondence to the first speech signal and the second speech signal.

6. A headset with a radio communication function comprising:
- a microphone configured to detect a speech of a wearer and generate a first speech signal;
- a transmission and reception unit configured to transmit the first speech signal by a short range radio communication, and receiving a second speech signal returned in response to the first speech signal by the short range radio communication;
- a memory unit configured to store the first speech signal and the second speech signal;
- a reproduction permission information memory unit configured to store conditions under which a reproduction of the first speech signal and the second speech signal is permitted;
- a reproduction permission judgment unit configured to judge whether the reproduction of the first speech signal and the second speech signal should be permitted or not, by referring to the reproduction permission information memory unit, when there is a request for the reproduction of the first speech signal and the second speech signal; and
- a speech synthesis unit configured to reproduce contents read out from the memory unit in forms of synthesized speeches, when the reproduction permission judgment unit judges that the reproduction should be permitted.

7. The headset with the radio communication function of claim 6, further comprising:
- a speech recognition unit configured to recognize reproduced speeches and convert recognized speeches into character strings, when the reproduction permission judgment unit judges that the reproduction should be permitted; and
- a text display unit configured to display the character strings obtained by the speech recognition unit.

8. The headset with the radio communication function of claim 6, further comprising:
- a keyword memory unit configured to store a prescribed keyword;
- an information production unit configured to produce a recording information to be stored in which a keyword information indicating the prescribed keyword is related to the first speech signal and the second speech signal, when the prescribed keyword is contained in either one of the first speech signal and the second speech signal;
- a section determination unit configured to extract the prescribed keyword by referring to the keyword information and determine a speech section containing the prescribed keyword, when the reproduction permission judgment unit judges that the reproduction should be permitted; and
- a reproduction unit configured to reproduce speeches in the speech section determined by the section determination unit.

9. A headset with a radio communication function comprising:
- a microphone configured to detect a speech of a wearer and generate a first speech signal;
- a transmission and reception unit configured to transmit the first speech signal by a short range radio communication, and receiving a second speech signal returned in response to the first speech signal by the short range radio communication;
- a memory unit configured to store the first speech signal and the second speech signal;
- a reproduction permission information memory unit configured to store conditions under which a reproduction of the first speech signal and the second speech signal is permitted;
- a reproduction permission judgment unit configured to judge whether the reproduction of the first speech signal and the second speech signal should be permitted or not, by referring to the reproduction permission information memory unit, when there is a request for the reproduction of the first speech signal and the second speech signal;
- a restricted keyword memory unit configured to store a prescribed restricted keyword for which the reproduction should be suppressed;
- an information production unit configured to produce a recording information to be stored in which a restricted keyword information indicating the prescribed restricted keyword is related to the first speech signal and the second speech signal, when the prescribed restricted keyword is contained in either one of the first speech signal and the second speech signal;
- a reproduction suppression judgment unit configured to judge whether the prescribed restricted keyword is contained in at least one of the first speech signal and the second speech signal, when the reproduction permission judgment unit judges that the reproduction should be permitted; and a reproduction suppression unit configured to suppress the reproduction of the prescribed restricted keyword when the reproduction suppression judgment unit detects the prescribed restricted keyword in at least one of the first speech signal and the second speech signal.

10. A communication recording system comprising: of
a first headset with a radio communication function; and
a second headset capable of carrying out radio communications with the first headset; wherein each one of the first headset and the second headset has
a microphone configured to detect a speech of a wearer of each headset and generate a first speech signal, and
a transmission and reception unit configured to transmit the first speech signal of each headset to another headset, and receiving a second speech signal transmitted from the another headset, and at least one of the first headset and the second headset also has
a time information acquisition unit configured to acquire a time information indicating occurrence times of the first speech signal and the second speech signal of each headset,
an information production unit configured to produce a recording information to be stored in which the time information is set in correspondence to the first speech signal and the second speech signal of each headset, and
a memory unit configured to store the recording information produced by the information production unit, and wherein both of the first headset and the second headset have the time information acquisition unit, and at least one of the first headset and the second headset also has a time adjustment unit configured to compare and adjust the time information obtained by the first headset and the time information obtained by the second headset.

11. The communication recording system of claim 10, wherein at least one of the first headset and the second headset also has:
a recording permission information memory unit configured to store conditions under which a recording is permitted; and
a recording permission judgment unit configured to judge whether the recording of the first speech signal and the second speech signal should be carried out or not, by referring to the recording permission information memory unit; and
the information production unit produces the recording information to be stored, when the recording permission judgment unit judges that the recording should be carried out.

12. A communication recording system, comprising:
a headset with a radio communication function; and
a device capable of carrying out radio communications with the headset;
wherein the headset has:
a microphone configured to detect a speech of a wearer of the headset and generate a first speech signal; and
a transmission unit configured to transmit the first speech signal to the device by a radio communication; and the device has:
a reception unit configured to receive the first speech signal from the headset;
a speech input unit configured to detect a speech of a person other than the wearer of the headset and generate a second speech signal;
a time information acquisition unit configured to acquire a time information indicating occurrence times of the first speech signal and the second speech signal;
an information production unit configured to produce a recording information to be stored in which the time information is set in correspondence to the first speech signal and the second speech signal; and
a memory unit configured to store the recording information produced by the information production unit.

13. The communication recording system of claim 12, wherein at least one of the headset and the device also has a video acquisition unit configured to acquire a video signal; and
the information production unit produces the recording information to be stored in which the time information is set in correspondence to the first speech signal and the second speech signal and the video signal acquired by the video acquisition unit.

14. The communication recording system of claim 12, wherein the device also has a position information acquisition unit configured to acquire a position information indicating places of occurrences of the first speech signal and the second speech signal; and
the information production unit produces the recording information to be stored in which the time information and the position information is set in correspondence to the first speech signal and the second speech signal.

15. The communication recording system of claim 12, wherein the device also has:
a speech recognition unit configured to recognize speeches from the first speech signal and the second speech signal and convert recognized speeches into character strings; and
a text information memory unit configured to store the character strings obtained by the speech recognition unit.

16. The communication recording system of claim 12, wherein the device also has an electronic watermark attaching unit configured to attach an electronic watermark to the first speech signal at a time of transmitting the first speech signal to another headset.

17. A communication recording system, comprising:
a first headset with a radio communication function;
a second headset capable of carrying out radio communications with the first headset; and
a device capable of carrying out radio communications with the first headset and the second headset;
wherein each one of the first headset and the second headset has:
a microphone configured to detect a speech of a wearer of each headset and generate a first speech signal; and
a transmission and reception unit configured to transmit the first speech signal of each headset to another headset, and receiving a second speech signal transmitted from the another headset; and the device has:
- a time information acquisition unit configured to acquire a time information indicating occurrence times of the first speech signal and the second speech signal of each headset;
- an information production unit configured to produce a recording information to be stored in which the time information is set in correspondence to the first speech signal and the second speech signal of each headset; and
- a memory unit configured to store the recording information produced by the information production unit.

18. The communication recording system of claim 17, wherein at least one of the first headset, the second headset and the device also has a video acquisition unit configured to acquire a video signal; and
the information production unit produces the recording information to be stored in which the time information is set in correspondence to the first speech signal and the second speech signal of each headset and the video signal acquired by the video acquisition unit.

19. The communication recording system of claim 17, wherein the device also has a position information acquisition unit configured to acquire a position information indicating places of occurrences of the first speech signal and the second speech signal of each headset; and
the information production unit produces the recording information to be stored in which the time information and the position information is set in correspondence to the first speech signal and the second speech signal of each headset.

20. The communication recording system of claim 17, wherein the device also has:
- a speech recognition unit configured to recognize speeches from the first speech signal and the second speech signal of each headset and convert recognized speeches into character strings; and
- a text information memory unit configured to store the character strings obtained by the speech recognition unit.

21. The communication recording system of claim 17, wherein the device also has an electronic watermark attaching unit configured to attach an electronic watermark to the first speech signal of each headset at a time of transmitting the first speech signal of each headset to the another headset.

22. A headset system comprising:
a first headset with a radio communication function; and
a second headset capable of carrying out radio communications with the first headset, wherein
each one of the first headset and the second headset has
- a microphone configured to detect a speech of a wearer of each headset and generate a first speech signal,
- a transmission and reception unit configured to transmit the first speech signal of each headset to another headset, and receiving a second speech signal transmitted from the another headset, and
- a state selection unit configured to enable the wearer of each headset to select
a desired communication state, and
the first headset also has
- a control method determination unit configured to determine a control method for communications between the first headset and the second headset, using inputs of a first desired communication state selected at the state selection unit of the first headset and a second desired communication state selected at the state selection unit of the second headset and transmitted to the first headset, according to a combination of the first desired communication state and the second desired communication state, and
- an execution unit configured to execute operations according to the control method determined by the control method determination unit, and
wherein the first headset also has a memory unit configured to store at least one of an environment information, a user relationship information, and a control command information; and the control method determination unit determines the control method by using at least one of the environment information, the user relationship information, and the control command information stored in the memory unit, in addition to the combination of the first desired communication state and the second desired communication state.

* * * * *